United States Patent
Leamy et al.

(10) Patent No.: US 10,024,289 B2
(45) Date of Patent: Jul. 17, 2018

(54) TWO-SCALE COMMAND SHAPING FOR REDUCING VEHICLE VIBRATION DURING ENGINE START OR RESTART

(71) Applicant: GEORGIA TECH RESEARCH CORPORATION, Atlanta, GA (US)

(72) Inventors: Michael Joseph Leamy, Atlanta, GA (US); James Justin Wilbanks, Central, SC (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/589,402

(22) Filed: May 8, 2017

(65) Prior Publication Data
US 2018/0038334 A1 Feb. 8, 2018

Related U.S. Application Data

(60) Provisional application No. 62/370,413, filed on Aug. 3, 2016.

(51) Int. Cl.
*F02B 75/06* (2006.01)
*F02N 11/08* (2006.01)

(52) U.S. Cl.
CPC ........ *F02N 11/08* (2013.01); *F02N 2200/021* (2013.01); *F02N 2300/104* (2013.01); *F02N 2300/2008* (2013.01); *F02N 2300/30* (2013.01)

(58) Field of Classification Search
CPC ............... F02N 11/08; F02N 2300/30; F02N 2300/104; F02N 2300/2008;
(Continued)

(56) References Cited

U.S. PATENT DOCUMENTS

| 2009/0118914 A1* | 5/2009 | Schwenke | B60K 6/445 |
| | | | 701/51 |
| 2010/0063775 A1* | 3/2010 | Colling | G01M 15/00 |
| | | | 702/182 |

(Continued)

FOREIGN PATENT DOCUMENTS

JP  5035187  *  7/2012  .............. F02N 11/04

OTHER PUBLICATIONS

Alkhatib,, F., "Techniques for Engine Mount Modeling and Optimization," Ph.D. thesis, 2013 (University of Wisconsin-Milwaukee.
(Continued)

*Primary Examiner* — Hai Huynh
(74) *Attorney, Agent, or Firm* — Troutman Sanders LLP; Ryan A. Schneider

(57) ABSTRACT

According to some aspects, methods and systems are presented to reduce noise, vibration, and harshness during start or restart of an engine. In some embodiments, a torque source such as an electric machine provides a torque to an internal combustion engine during restart to counteract vibrations of the system caused by the output torque of the internal combustion engine. The torque provided by the torque source can be expressed as a sum of a non-linear component and an input shaped component. A perturbation technique can be utilized for separating the scales and isolating the non-linear response of the system. Command shaping can be applied to the remaining, linear response of the system. Parameters used in the modeling of the internal combustion engine and the system may be pre-determined based on vehicle design and operating conditions, or may be iteratively estimated based on previous restarts during vehicle operation.

20 Claims, 18 Drawing Sheets

(58) Field of Classification Search
CPC . F02N 2200/021; B60W 10/06; B60W 30/20; B60W 2030/206; F16F 15/20; F16F 15/18; G01H 1/04
USPC .................. 123/192.1; 701/112, 113; 73/649
See application file for complete search history.

(56) References Cited

U.S. PATENT DOCUMENTS

| | | | | |
|---|---|---|---|---|
| 2012/0078456 | A1* | 3/2012 | Hakumura | B60L 3/003 701/22 |
| 2013/0074809 | A1* | 3/2013 | Nakamoto | F02N 11/08 123/478 |
| 2013/0325185 | A1* | 12/2013 | Ye | B60W 10/08 700/275 |
| 2014/0100733 | A1* | 4/2014 | Christ | B60W 10/08 701/22 |
| 2017/0010173 | A1* | 1/2017 | Bizub | G01L 23/221 |
| 2017/0210375 | A1* | 7/2017 | Orlamunder | B60W 20/17 |
| 2017/0334448 | A1* | 11/2017 | Schwunk | B60W 30/20 |

OTHER PUBLICATIONS

Bae, et al., "Road grade and vehicle parameter estimation for longitudinal control using GPS," Proceedings of the IEEE Conference on Intelligent Transportation Systems, 2001, Oakland, CA.

Billings and Voon, "Least squares parameter estimation algorithms for non-linear systems," International Journal of Systems Science 1984, pp. 601-615, 15(6).

Brooke, L., "GM unveils more efficient 2016 Volt Powertrain," SAE Automotive Engineering Magazine Article 2014, No. 13666.

Canova, et al., "On the Control of Engine StartiStop Dynamics in a Hybrid Electric Vehicle," Journal of Dynamic Systems, Measurement and Control, Transactions of the ASME, 2009, pp. 1-12, 131(6).

Chen and Flynn, "Development of a Single Cylinder Compression Ignition Research Engine," 1965, SAE Technical Paper No. 650733.

Chowdhary and Jategaonkar, "Aerodynamic parameter estimation from flight data applying extended and unscented Kalman filter," Aerospace Science and Technology, 2010, pp. 106-117, 14(2).

Heydinger, et al., "Measured vehicle inertial parameters-NHTSA's data through Nov. 1998," SAE Technical Paper 1999, No. 1999-01-1336.

Julier and Uhlmann, "Unscented filtering and nonlinear estimation," 2004, Proceedings of the IEEE, p. 401-422, 92(3).

Kum and Bucknor, "Supervisory Control of Parallel Hybrid Electric Vehicles for Fuel and Emission Reduction," Journal of Dynamic Systems, Measurement, and Control, 2011, pp. 061010-1-061010-10, 133(6).

Kum, et al., "Control of Engine-Starts for Optimal Drivability of Parallel Hybrid Electric Vehicles," Journal of Dynamic Systems, Measurement and Control, Transactions of the ASME, 2013, 135(2).

Leonard, A., "Vehicle Tracking Us Wideband Radar," Master's thesis, 2016, Georgia Institute of Technology.

Marquardt, D.W., "An algorithm for least-squares estimation of nonlinear parameters," Journal of the Society for Industrial and Applied Mathematics, 1963, p. 431-441, 11(2).

McGee, L. A. and Schmidt, S. F., "Discovery of the Kalman filter as a practical tool for aerospace and industry," NASA Technical Memorandum 1985, No. 86847.

Miyamoto, et al., "Description and analysis of diesel engine rate of combustion and performance using Wiebe's functions," SAE Technical Paper 1985, No. 850107.

Morrow, et al., "Analysis of Policies to Reduce Oil Consumption and Greenhouse-Gas Emissions from the US Transportation Sector," Energy Policy, 2010, pp. 1305-1320, 38(3).

Moseler, and Isermann, "Application of Model-Based Fault Detection to a Brushless DC Motor," IEEE Transactions on Industrial Electronics, 2000, pp. 1015-1020, 47(5).

Murayama, et al., "A Method to Improve the Solubility and Combustion Characteristics of Alcohol-Diesel Fuel Blends," SAE Technical Paper No. 821113, 1982.

Ooi and Ripin, "Dynamic stiffness and loss factor measurement of engine rubber mount by impact test," Materials & Design, 2011, pp. 1880-1887, 32(4).

Opila, et al., "An Energy Management Controller to Optimally Trade Off Fuel Economy and Drivability for Hybrid Vehicles," IEEE Transactions on Control Systems Technology, 2012, pp. 1490-1505, 20(6).

Park and Park, "Torque Control of a Vehicle with Electronic Throttle Control Using an Input Shaping Method," International Journal of Automotive Technology, 2013, pp. 189-194, 14(2).

Ponti, et al., "A Phenomenological Combustion Model for Common Rail Multi-Jet Diesel Engine," ASME 2004 Internal Combustion Engine Division Fall Technical Conference, 2004, Long Beach, CA.

Rodriguez and Emadi, "A Novel Digital Control Technique for Brushless DC Motor Drives," IEEE Transactions on Industrial Electronics, 2007, pp. 2365-2373, 54(5).

Ryu, et al., "Vehicle sideslip and roll parameter estimation using GPS," Proceedings of the AVEC International Symposium on Advanced Vehicle Control, 2002, Hiroshima, Japan.

Singh and Vadali, "Robust time-delay control," Journal of Dynamic Systems, Measurement, and Control, 1993, pp. 303-306, 115(2A).

Singhose, W., "Command shaping for Flexible Systems: A Review of the First 50 Years," International Journal of Precision Engineering and Manufacturing, 2009, p. 153-168, 10(4).

Singhose, and Vaughan, "Reducing vibration by digital filtering and input shaping," IEEE Transactions on Control Systems Technology, 2011, pp. 1410-1420, 19(6).

Singhose, et al., "Convolved and Simultaneous Two Mode Input Shapers," IEE Proceedings—Control Theory and Applications, 1997, pp. 515-520, 144(6).

Singhose, et al., "Vibration Reduction Using Multi-Hump Input Shapers," Journal of Dynamic Systems, Measurement, and Control, 1997, pp. 320-326, 119(2).

Singhose, et al., "Residual Vibration Reduction Using Vector Diagrams to Generate Shaped Inputs," Journal of Mechanical Design, 1994, pp. 654-659, 116(2).

Smith, O.J., "Posicast control of damped oscillatory systems," Proceedings of the IRE, 1957, pp. 1249-1255, 45(9).

Sood, et al., N.A., "Engine Fault Analysis: Part II—Parameter Estimation Approach," IEEE Transactions on Industrial Electronics, 1985, pp. 301-307, 4.

Togai and Platten, "Input Torque Shaping for Driveline NVH Improvement and Torque Profile Approximation Problem with Combustion Pressure," Proceedings of the FISITA 2012 World Automotive Congress, 2013.

Unger, et al., "A novel methodology for non-linear system identification of battery cells used in non-road hybrid electric vehicles," Journal of Power Sources, 2014, pp. 883-897, 269.

Vaughan, et al., "Comparison of Robust Input Shapers," Journal of Sound and Vibration, 2008, pp. 797-815, 315(4-5).

Vimmerstedt, et al., "High Penetration of Renewable Energy in the Transportation Sector: Scenarios, Barriers, and Enablers," NREL/CP-6A20-54442, 2012.

Wang, et al., "Start and Acceleration Optimization of a Parallel Hybrid Electric Vehicle," 2011, pp. 591-607, 225(05).

Wilbanks and Leamy Two-Scale Command Shaping for Reducing Powertrain Vibration during Engine Restart. Journal of Dynamic Systems, Measurement, and Control, (In Press), 2017.

Wilbanks and Leamy, "Analyzing the Robustness of Two-Scale Command Shaping for Reducing Powertrain Vibration During Engine Restart," ASME 2016 International Design Engineering Technical Conferences and Computers and Information in Engineering Conference, 2016, Charlotte, NC.

Zuo et al., "Engine Stmt Control Strategy Research for Parallel Series Hybrid Electrical Vehicles," 2010 8th World Congress on In Intelligent Control and Automation, 2010, pp. 2097-2102.

* cited by examiner $$A_\delta(k) = \frac{df}{dx_\delta}\bigg|_{x_\delta = \hat{x}_\delta(k-1)} = \begin{bmatrix} -k_{CL} & \frac{\partial T_{Friction}(k-1)}{\partial \hat{\theta}_E} + \frac{\partial T_{Motorcad}(k-1)}{\partial \hat{\theta}_S} & 0 & 0 & -c_{CL} - 4k_{\omega_E}(k-1) - 8k_{\omega_E^3}(k-1)\hat{\theta}_E(k-1) & 1 & 0 & 0 & 0 & 0 \\ \frac{k_{CL}}{J_E + J_M} & \frac{k_{CL}}{J_{CL}} & & & \frac{c_{CL}}{J_E + J_M} & & \frac{c_{CL}}{J_E + J_M} & -1 & -\rho(\hat{\theta}_S(k-1)) & -4\hat{\theta}_S(k-1) & -4\hat{\theta}_S(k-1)^3 \\ -\frac{k_{CL}}{J_{CL}} & & & -\frac{c_{CL}}{J_{CL}} & & & \frac{J_E + J_M}{J_E + J_M} & \frac{J_E + J_M}{J_E + J_M} & \frac{J_E + J_M}{J_E + J_M} \\ 0 & & & 0 & & & 0 & 0 & 0 & 0 \\ 0 & & & 0 & & & 0 & 0 & 0 & 0 \\ 0 & & & 0 & & & 0 & 0 & 0 & 0 \\ 0 & & & 0 & & & 0 & 0 & 0 & 0 \end{bmatrix}$$

FIG. 19

TWO-SCALE COMMAND SHAPING FOR REDUCING VEHICLE VIBRATION DURING ENGINE START OR RESTART

CROSS-REFERENCE TO RELATED APPLICATION

This Application claims priority to and benefit of U.S. Provisional Patent Application No. 62/370,413, filed Aug. 3, 2016, which is hereby incorporated by reference herein in its entirety as if fully set forth below.

STATEMENT OF RIGHTS UNDER FEDERALLY-SPONSORED RESEARCH

This invention was made with government support under Grant DGE-1148903 from the National Science Foundation. The government has certain rights in this invention.

BACKGROUND

Hybrid electric vehicles (HEVs) have gained prominence in the automotive market due to a diminishing supply of fossil fuels, increased concern over greenhouse gas (GHG) emissions, and increasingly stringent governmental regulations on automobiles. The transportation sector in the United States was responsible for 33% of the GHG emissions and 71% of the petroleum usage in the country in 2012. HEVs represent a pragmatic solution to the need for fuel efficient vehicles due to the rise in their acceptance in the market and general performance relative to other alternative powertrain configurations, such as electric vehicles.

A driver's perceived vehicle quality is based in part on its drivability. Thus, increasing the drivability of HEVs would likely further improve consumer acceptance and utilization of HEVs. The drivability of a vehicle includes various performance metrics, such as acceleration and gradeability, as well as the frequency of unwanted behavior within the powertrain, which includes noise, vibrations, and harshness issues. Drivability and fuel economy of HEVs are competing goals because there is typically a trade-off between these two objectives; therefore, it is imperative that any method used to improve drivability does not negatively impact fuel economy.

One source of drivability issues in HEVs is the restart of the internal combustion engine (ICE) after a period in which the vehicle is in a pure electric drive mode. Similarly, the restart of the ICE in vehicles equipped with a stop-start features may also present a drivability issue.

Existing approaches have focused on altering the supervisory controller using optimal control algorithms, such as shortest-path stochastic dynamic programming (SP-SDP) or deterministic dynamic programming (DDP), or implementing feedback control strategies for the supervisory controller and/or lower level control systems. These control strategies significantly add to the vehicle controller complexity and require substantial tuning for each HEV platform.

It is with respect to these and other considerations that various embodiments of the present invention are presented herein.

SUMMARY

The present invention, in some aspects, relates to improving drivability of motor vehicles and, more specifically, to reducing noise, vibration, and harshness (NVH) caused during startup of an internal combustion engine (ICE) by providing a counteracting torque coupled to the internal combustion engine crankshaft.

Input shaping of the torque profile delivered to the ICE by a torque source such as an electric machine (EM) during ICE start or restart is a promising methodology to improve interruptions in power delivery to the wheels of a vehicle and reduce the vibrations in the powertrain during mode transitions and torque fluctuations in the ICE. Input shaping, or command shaping, is a feed-forward control methodology that can be utilized to reduce vibrations in a system controlled digitally. The command generated with input shaping mitigates the vibration that would have been caused by the equivalent unshaped command. Input shaping can be utilized in the development of a control strategy for an HEV or a vehicle equipped with start-stop features to allow the torque source to assist the ICE in providing the driver with a smooth start or a smooth restart after a period in a pure electric drive mode. In addition, a control algorithm using input shaping can provide potential improvements in performance of HEVs relative to conventional vehicles by providing the driver with constant power delivery during mode transitions or powertrain configuration changes.

In some aspects, the present invention relates to methods and systems which, in some embodiments reduce vibration during start or restart of an ICE. In some example embodiments, the torque source is configured to provide a torque during start or restart of the ICE, wherein the torque of the torque source is generated in response to a command signal, wherein the command signal may be expressed as a sum of a non-linear component and an input shaped component.

The command signal may be configured to cause the generation of a torque output from the torque source such that the torque output reduces the vibration of the ICE and the vibration of a first mechanical component or first group of mechanical components during start or restart of the ICE. The command signal may be based at least in part on a modeled torque profile of the ICE and at least one modeled vibration mode of the mechanical component or group of mechanical components (such as a powertrain or vehicle chassis) in mechanical communication with the ICE. The non-linear component of the command signal may be configured to generate a torque from the torque source that is tailored to eliminate oscillations within the system or vibrations of the ICE associated with a non-linear ICE response to start or restart. The input shaped component of the command signal may be configured to generate a torque from the torque source that is tailored to reduce oscillations from at least one vibration mode of a mechanical component or group of mechanical components caused by the linear ramp-up of the ICE during restart.

The non-linear component of the command signal may be based at least in part on a crank angle of the ICE as a function of time, wherein the crank angle is the angle of rotation of a crankshaft associated with motion within a cylinder of the ICE. The non-linear component may be based at least in part on an approximation of non-linear torque dynamics of rotation of the crankshaft of the ICE during start or restart. The non-linear component of the command signal may be approximated by applying a perturbation technique to a physical model of a piston crank-slider system of the ICE to approximate the non-linear torque dynamics of the ICE. The non-linear component may comprise an asymptotic approximation of the crank angle, wherein the asymptotic approximation of the crank angle includes a zeroth-order term and a first order term and the approximation of the non-linear torque dynamics is determined by equating the acceleration of the first-order term and its derivatives to zero.

The input shaped component may be based at least in part on at least one modeled vibration mode of a mechanical component or group of mechanical components, for example, powertrain flexible poles or vehicle chassis components. The input shaped component may be based on a lumped parameter model including models of the first mechanical component or first group of mechanical components, the ICE, and a coupling between the first mechanical component or first group of mechanical component and the ICE, wherein the lumped parameter model provides a means to determine a natural frequency and a damping ratio. The input shaped component may be configured to reduce the vibration of the first mechanical component or first group of mechanical components, where this vibration is caused by the linear ramp-up of torque generated by the rotation of the crankshaft of the ICE during start or restart of the ICE.

The input shaped component of the command signal may be based at least in part on an input shaper, such as a Zero Vibration (ZV) input shaper, a Zero Vibration Derivative (ZVD) input shaper, or an Extra-Intensive (EI) input shaper. The input shaped component may be based at least in part on a convolution of multiple input shapers, the convolution being configured to reduce oscillations associated with multiple vibration modes of the system, where each input shaper is configured to reduce oscillations associated with a vibration mode of a mechanical component or group of mechanical components in mechanical communication with the ICE. Each input shaper may be based on a natural frequency and a damping ratio characterizing the associated vibration mode.

The command signal may be based at least in part on a physical model of piston kinematics of the ICE, wherein the physical model may include a plurality of physical parameters. The command signal may be based at least in part on physical parameters of the ICE that are predetermined based on ICE design and operating conditions. Alternatively, or additionally, the command signal may be based at least in part on physical parameters that are estimated based on data from previous restarts during vehicle operation. Algorithms such as recursive least-square or extended Kalman filtering may be utilized to estimate a physical parameters based on data gathered from previous restarts during vehicle operation. Physical parameters that may be estimated based on previous restarts include but are not limited to inertia, stiffness, damping, friction coefficient, and compression ratio.

In some embodiments, methods may be incorporated into a system where ICE start and/or restart is assisted by torque from an EM, such as many models of motor vehicles. Vehicles configured to provide EM torque during restart include but are not limited to parallel HEVs, power-split HEVs, integrated starter generator (ISG, also known as integrated motor assist "IMA") HEVs, or vehicles incorporating start-stop functionality. In some embodiments, the system may consist of an EM control module configured to provide a command signal, wherein the command signal is configured to cause the generation of an EM torque output such that the EM torque output counteracts vibrations caused by the non-linear dynamics of rotation of the crankshaft of the ICE during start or restart and counteract vibrations of mechanical components or groups of components in mechanical communication with the ICE.

The EM control module may generate the command signal and provide the command signal to an EM power inverter in electrical communication with the EM rotor. The EM control module may utilize sensor data in the generating of the command signal. Sensor data may originate from an ICE shaft encoder, EM rotor position sensor, an accelerometer, a temperature sensor, a displacement sensor, a phase motor current sensor, a battery current sensor, a pressure sensor, or an airflow sensor, for example. The system may further comprise a memory device in communication with the controller, the memory device configured to store data to provide to the controller, wherein the providing of the stored command signal by the electronic controller is based at least in part on data provided from the memory device.

As will be appreciated, in some embodiments, methods may be incorporated into a system where ICE restart is assisted by a torque source other than an EM in a similar manner. For example, methods may be incorporated into a system wherein ICE start and/or restart is assisted by a hydraulic motor or a pneumatic motor.

Other aspects and features according to the example embodiments of the present invention will become apparent to those of ordinary skill in the art, upon reviewing the following detailed description in conjunction with the accompanying figures.

BRIEF DESCRIPTION OF THE DRAWINGS

The foregoing and other features and advantages of the invention are apparent from the following detailed description taken in conjunction with the accompanying drawings, which are not necessarily drawn to scale, and in which:

FIG. 19 depicts an equation for a linearized state matrix of an augmented extended Kalman filtering system consisting of a powertrain model.

DETAILED DESCRIPTION

Figure 1:
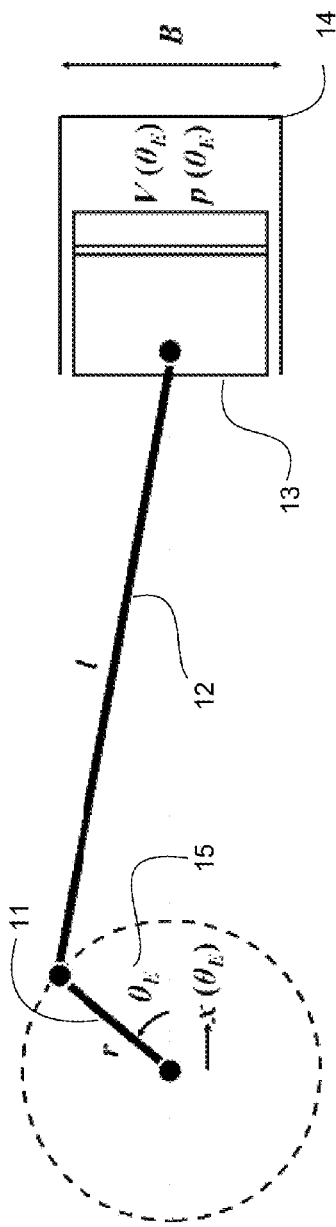
FIG. 1 depicts a one-dimensional model of a piston crank-slider system.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

In some aspects, the present invention relates to reducing NVH during startup of an internal combustion engine, and more specifically to providing a torque from a torque source such as an EM connected to the crank shaft of the ICE during startup of the ICE. Although some embodiments disclosed herein focus on the EM as the torque source, as will be appreciated, the torque source need not be an EM, and could be a hydraulic motor or a pneumatic motor, for example. Example embodiments describing EM torque should be understood as non-limiting examples.

Some example embodiments are directed to systems and methods for providing a torque from a torque source connected to the crankshaft of an ICE, wherein the torque from the torque source may be represented as a sum of two components: an input shaped component and a non-linear component:

$$T_M = T_0 + \varepsilon T_1 \quad \text{(Equation 1)}$$

where $T_M$ is the torque from a torque source, $T_0$ is the input shaped component, $T_1$ is the non-linear component, and $\varepsilon$ is a small parameter used in ordering the input shaped component and the non-linear component, which is set to unity after the equation for the non-linear component $T_1$ is determined. Separating the non-linear component using perturbation and then applying command shaping to the remaining linear scale is referred to herein as two-scale command shaping (TSCS).

In some embodiments, the non-linear component $T_1$ may be calculated using an analytical ICE model where the non-linear component is determined by approximating the non-linear dynamics of the ICE using perturbation. The input shaped component $T_0$ may be calculated using a lumped parameter model including the equivalent inertia of bodies physically coupled to the ICE, stiffness values for each coupling mechanism, and damping coefficients for each coupling mechanism. The input shaped component $T_0$ may be calculated to reduce the vibrations of bodies in the lumped parameter model due to a linear excitation from the ICE.

Analytical ICE Model

FIG. 1 is a diagram of a one-dimensional representation of an ICE model illustrating various aspects of the present invention. As shown, the model includes a compression chamber 14, a piston head 13, a piston rod 12, and a crank shaft 11 to express the torque provided by the ICE as a function of crank angle $\theta_E$ 15. The volume within each of the compression chambers 14 can be derived by representing the piston assembly of the engine as a crank-slider mechanism. Using the kinematic analysis of a crank-slider, the instantaneous volume within one of the compression chambers of the engine can be expressed as:

$$V(\theta_E) = V_C + \frac{\pi B^2 r}{4}\left[\frac{l}{r} + (1 - \cos\theta_E) - \sqrt{\frac{l^2}{r^2} - \sin^2\theta_E}\right] \quad \text{(Equation 2)}$$

where $V_C$ is the clearance volume of the compression chamber 14, B is the bore diameter of the compression chamber 14, r is the radius of the crank shaft 11, l is length of the piston rod 12, and $\theta_E$ is the crank angle 15.

The in-cylinder pressure may also be incorporated to develop an expression for the torque generated by the ICE. In-cylinder pressure of a single compression chamber may be governed from intake valve closing (IVC) to exhaust valve opening (EVO) by the following differential equation:

$$\frac{dp}{d\theta_E} = -\gamma \frac{p}{V}\frac{dV}{d\theta_E} + \frac{(\gamma-1)}{V}\frac{dQ}{d\theta_E} \quad \text{(Equation 3)}$$

where p denotes the in-cylinder pressure, γ the specific heat ratio for the air-fuel mixture, and Q the heat release from combustion. As an example, Q may be approximated with Wiebe functions. During the initial cranking, heat released from combustion may be absent, and the $$\frac{dQ}{d\theta_E}$$

term may be set to zero.

For the purposes of calculation and not limitation, assuming negligible losses through the intake and exhaust ports at idle speed and minimum load, the in-cylinder pressure during intake and exhaust strokes can be taken as the manifold pressure. The manifold pressure may be taken as ambient when a turbocharger provides almost no boosting and an exhaust gas recirculation valve is open, if equipped. Subsequently solving Equation 3 yields:

$$p(\theta_E) = C V^{-\gamma} \quad \text{(Equation 4)}$$

which represents a polytropic thermodynamic process. The coefficient C is a constant determined by known ICE operating points.

The torque acting on the ICE crankshaft may be decomposed into three components:

$$T_E(\theta_E) = T_{Indicated}(\theta_E) + T_{Inertial}(\theta_E) - T_{Friction}(\theta_E) \quad \text{(Equation 5)}$$

where $T_{Indicated}$ denotes the indicated torque from the ICE that arises from the in-cylinder pressure, $T_{Inertial}$ denotes the inertial torque due to the apparent forces arising from the ICE components in reciprocating motion, and $T_{Friction}$ denotes the approximate torque due to frictional losses.

The indicated torque derives from the force exerted on the piston due to the in-cylinder pressure, which may be given as:

$$T_{Indicated}(\theta_E) = rA_p(p(\theta_E) - p_{Ambient})\left(\sin\theta_E + \frac{\sin\theta_E \cos\theta_E}{\sqrt{R^2 - \sin^2\theta_E}}\right) \quad \text{(Equation 6)}$$

where $A_p$ denotes the piston crown area, $p_{Ambient}$ is ambient pressure, and R is the ratio of the connection rod length to the crank length.

The friction torque may be approximated using a polynomial expression defined using the instantaneous ICE speed $\dot{\theta}_E$ and the in-cylinder pressure:

$$T_{Friction}(\theta_E) = T_{Friction_0} + k_p p(\theta_E) + k_{\omega_1}\dot{\theta}_E + k_{\omega_2}\dot{\theta}_E^2 \quad \text{(Equation 7)}$$

where $T_{Friction_0}$, $k_p$, $k_{\omega_1}$, and $k_{\omega_2}$ may be experimentally defined parameters that fit the model to measured data.

As an example, neglecting the effects of friction and inertial torque, the output torque of the ICE before combustion may be expressed as:

$$T_E(\theta_E) = \left(rA_p\left(C\left(V_C + \frac{1}{2}V_C(C_r - 1)[R + 1 - \cos\theta_E - (R^2 - \sin^2\theta_E)^{1/2}]\right)^{-\gamma} - p_{amb}\right)\sin\theta_E + \frac{\sin\theta_E \cos\theta_E}{\sqrt{R^2 - \sin^2\theta_E}}\right) \quad \text{(Equation 8)}$$

Where r is the crank length, $A_p$ is the surface area of the piston, $V_C$ is the clearance volume, C is the coefficient derived using an ideal pressure relationship to represent the compression of the air-fuel mixture, $C_r$ is the compression ratio, R is the ratio of the connection rod length to the crank length, and $\gamma$ is the specific heat ratio for the fuel mixture.

The above development is for a single cylinder of the ICE, which can be extended to the complete engine by adding the correct phase lag for each cylinder that represents the optimal crank rotation between firing events.

In some embodiments, the non-linear component of the torque of the torque source is calculated to eliminate the ICE oscillations by isolating the non-linear portion of the analytical ICE model, where the analytical ICE model may, for example, be represented as shown in FIG. 1 and derived in Equations 5-7 or Equation 8 above.

Lumped Parameter Model

Figure 2:
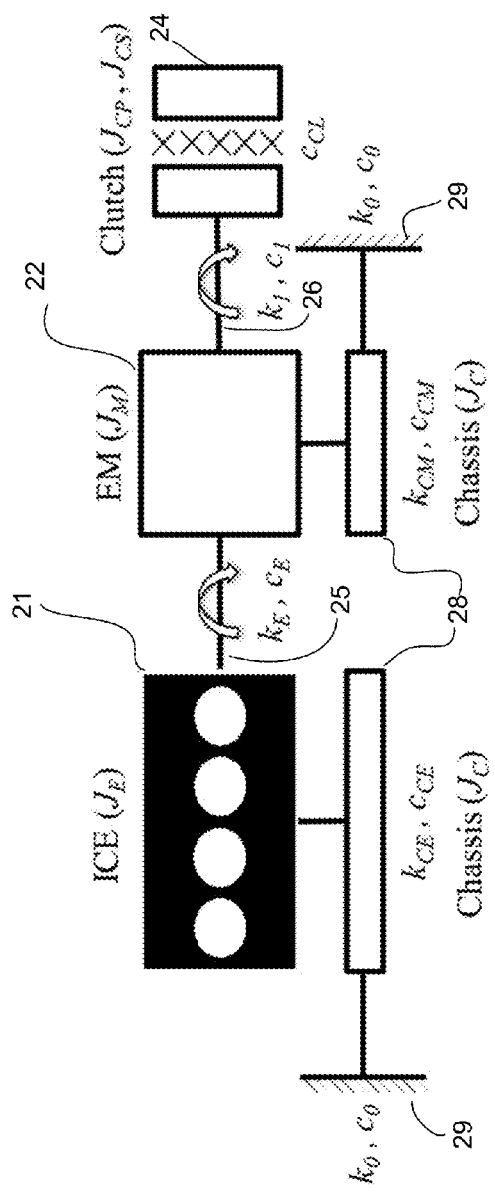
FIG. 2 depicts a lumped parameter model of a powertrain and chassis.

FIG. 2 shows a lumped-parameter torsional powertrain model of a general HEV design incorporating an EM as the torque source connected to the crankshaft of the ICE. The model shown in FIG. 2 is used to study the ICE 21, the EM 22, the clutch 24, and the chassis 28 dynamics during stationary ICE start and restart in accordance with various aspects of the present invention. In practice, the lumped parameter model could be based on a specific system construction, rather than the generic HEV model depicted by FIG. 2.

During stationary start or restart, the clutch is disengaged and decoupled from the rotary motion of the wheels, although the vehicle itself may be in motion. A similar analysis may be performed on a launch assist ICE restart. During a launch assist restart, the clutch is engaged while the vehicle is in motion. While current consumer HEVs may use stationary restart in lieu of launch assist restart, launch assist restart may be used in specialized or performance vehicles.

In the model shown in FIG. 2, $k_E$ and $c_E$ are the stiffness value and damping coefficient for the shaft 25 between the ICE and the EM. Similarly $k_1$ and $c_1$ are the stiffness value and damping coefficient for the shaft 26 between the EM and the clutch, $k_{CE}$ and $c_{CE}$ model the connection between the chassis 28 and the ICE 21, $k_{CM}$ and $c_{CM}$ model the connection between the chassis 28 and the EM 22, and $k_0$ and $c_0$ model the connection between the chassis 28 and the wheels 29.

Based on the example lumped parameter model of FIG. 2, the dynamic model can be defined as:

$$\begin{bmatrix} J_E \ddot{\theta}_E \\ J_M \ddot{\theta}_M \\ J_{CP} \ddot{\theta}_{CL} \\ J_C \ddot{\theta}_C \end{bmatrix} = [C]\begin{bmatrix} \dot{\theta}_E \\ \dot{\theta}_M \\ \dot{\theta}_{CL} \\ \dot{\theta}_C \end{bmatrix} + [K]\begin{bmatrix} \theta_E \\ \theta_M \\ \theta_{CL} \\ \theta_C \end{bmatrix} + \begin{bmatrix} T_E \\ T_M \\ 0 \\ 0 \end{bmatrix} \quad \text{(Equation 9)}$$

where $J_E$, $J_M$, $J_{CP}$, and $J_C$ are the inertias of the ICE 21, EM 22, clutch 24, and chassis 28, respectively. The input to the model is the torque of the EM. In this example, the clutch is assumed to be disengaged; therefore, the damping in the clutch is neglected in the analysis and the inertia for the clutch is defined as the inertia of the driven plate assembly. This assumption is for the purposes of facilitating calculation for this example.

Using the example lumped parameter model in FIG. 2, the damping coefficient matrix in Equation 9 can be defined as:

$$[C] = \begin{bmatrix} -(c_E + c_{CE}) & c_E & 0 & c_{CE} \\ c_E & -(c_E + c_{CM} + c_1) & c_1 & c_{CM} \\ 0 & c_1 & -(c_1 + c_{CL}) & 0 \\ c_{CE} & c_{CM} & 0 & -(c_{CE} + c_{CM} + c_1) \end{bmatrix} \quad \text{(Equation 10)}$$

The stiffness matrix in Equation 9 can be defined as:

$$[K] = \begin{bmatrix} -(k_E + k_{CE}) & k_E & 0 & k_{CE} \\ k_E & -(k_E + k_{CM} + k_1) & k_1 & k_{CM} \\ 0 & k_1 & -k_1 & 0 \\ k_{CE} & k_{CM} & 0 & -(k_{CE} + k_{CM} + k_1) \end{bmatrix}. \quad \text{(Equation 11)}$$

The EM and ICE coupling can be defined to be a pre-transmission configuration, such as the Honda ISG. This assumption is for the purposes of facilitating calculation for this example. In practice, the lumped parameter model and associated parameters may be based on a specific vehicle design that may be configured differently. With the pre-transmission configuration, the coupling between the EM and the ICE may be approximated as being rigid with negligible damping and the EM may be assumed to be mounted with the same mounts as the ICE, which defines the values $k_E$, $C_E$, $k_{CM}$, and $c_{CM}$.

Scale Separation to Determine $T_1$

In an embodiment represented by Equation 1, the output torque from the torque source such as an EM $T_M$ may be expressed as the sum of an input shaped component $T_0$ and a non-linear component $T_1$. Separating the scales, i.e., isolating a non-linear component of the output torque of the ICE during start or restart, may be accomplished using a perturbation technique. Based on the model presented in FIG. 1, and neglecting the effects of friction and inertial torque, the acceleration of the crank angle $\theta_E$ 15 of the ICE may be represented as:

$$\ddot{\theta}_E = \frac{T_0 + \varepsilon T_1(t)}{J_E} + \quad \text{(Equation 12)}$$

$$\frac{\varepsilon}{J_E}\left(rA_p(p(\theta_E) - p_{Ambient})\left(\sin\theta_E + \frac{\sin\theta_E \cos\theta_E}{\sqrt{R^2 - \sin^2\theta_E}}\right)\right) +$$

$$c_E(\dot{\theta}_M - \dot{\theta}_M) + c_{CE}(\dot{\theta}_C - \dot{\theta}_E) +$$

$$k_E(\theta_M - \theta_E) + k_{CE}(\theta_C - \theta_E).$$

Neglecting the effects of friction and inertial torque are for the purposes of facilitating calculations in this example implementation. The scale separation method may be performed on a model which accounts for friction, inertial torque, and other parameters not considered here.

In some example embodiments, an asymptotic approximation for $\theta_E$ may be used to facilitate the isolation of the non-linear component of the output torque of the ICE during start and restart as follows:

$$\theta_E = \theta_0(t) + \varepsilon\theta_1(t) + \varepsilon^2\theta_2(t) \quad \text{(Equation 13)}$$

where $\theta_0$ is the zeroth-order approximation of $\theta_E$, $\theta_1$ is the first-order approximation of $\theta_E$, $\theta_2$ is the second-order approximation of $\theta_E$, and $\varepsilon$ is a book-keeping parameter.

Substituting the asymptotic approximation of Equation 13 for $\theta_E$ in Equation 12 and solving for the acceleration of the zeroth-order approximation yields:

$$\ddot{\theta}_0 = \frac{d^2}{dt^2}\theta_0(t) = \frac{T_0}{J_E} + c_E(\dot{\theta}_M - \dot{\theta}_0) + \quad \text{(Equation 14)}$$

$$c_{CE}(\dot{\theta}_C - \dot{\theta}_0) + k_E(\theta_M - \theta_0) + k_{CE}(\theta_C - \theta_0).$$

The non-linear dynamics of the ICE can be approximated by solving Equation 12 for the acceleration of the first-order approximation of $\theta_E$ as follows:

$$\ddot{\theta}_1 = \frac{T_1(t)}{J_E} + \quad \text{(Equation 15)}$$

$$\frac{1}{J_E}\left(rA_p(p(\theta_0) - p_{Ambient})\left(\sin\theta_0 + \frac{\sin\theta_0 \cos\theta_0}{\sqrt{R^2 - \sin^2\theta_0}}\right)\right).$$

In some embodiments, the non-linear component of the EM torque may be determined by setting $\ddot{\theta}_1$ to zero and solving for $T_1$. Utilizing Equation 15 as an example, the non-linear component of the EM torque may be represented as:

$$T_1(t) = -\left(rA_p(p(\theta_0) - p_{Ambient})\left(\sin\theta_0 + \frac{\sin\theta_0 \cos\theta_0}{\sqrt{R^2 - \sin^2\theta_0}}\right)\right). \quad \text{(Equation 16)}$$

Input Shaping to Determine $T_0$

In general, input shaping (a command shaping method) is a technique that reduces vibration in a system caused by a force from a computer controlled machine. In operation, input shaping can provide a control signal to the machine that is time varying and based on the vibration modes of the system. Typically, during start or restart of an ICE initiated by a torque source such as an EM, the torque source may be provided a simple, unshaped torque command, such as a step function. Taking into account the vibration modes of the system (for example those of a HEV modeled in FIG. 2), and applying input shaping to a step function torque command signal will result in a time-varying torque command and thus a time-varying output torque from the torque source that reduces the modeled vibration modes of the system.

Input shaping techniques are largely effective at reducing a system's linear vibrational response. In an example embodiment characterized by Equation 1, the non-linear ICE dynamics during start or restart are compensated for by $T_1$, the non-linear component of the torque from the torque source. Using separation of scales, the remaining ICE dynamics during start or restart are largely linear, and may be effectively reduced by providing an input shaped component $T_0$ torque from the torque source.

Several input shaping techniques that may be applied in accordance with various example embodiments, may include, but are not limited to, Zero Vibration (ZV), Zero Vibration and Derivative (ZVD), Extra Intensive (EI), etc. Input shapers designed to mitigate a single frequency may be convolved to generate a multi-mode input shaper design to mitigate each of the design frequencies of the individual input shapers.

For example, a ZV input shaper can be represented as:

$$\begin{bmatrix} A_i \\ t_i \end{bmatrix} = \begin{bmatrix} \frac{1}{1+K} & \frac{K}{1+K} \\ 0 & \frac{\pi}{\omega_d} \end{bmatrix}, K = e^{\left(\frac{-\zeta\pi}{\sqrt{1-\zeta^2}}\right)} \quad \text{(Equation 17)}$$

where the example ZV input shaper is defined by two pulses, each pulse having an amplitude A, at a time $t_i$. The ZV input shaper can then be convolved with an unshaped command input (for example a step function) to create a shaped command input that reduces the oscillations at a frequency characterized by a damped natural frequency $\omega_d$ and a damping ratio $\zeta$.

The natural frequency and damping ratio for a lumped parameter system model may be obtained by using a modal coordinate transformation on a state space model representing the linear response defined by the scale remaining after the application of the scale separation perturbation technique. Equation 17 may then be utilized to define a ZV input shaper for each vibration mode that decreases drivability of a vehicle. Once a ZV input is defined for each pertinent mode, the input shapers can be convolved to result in a multi-mode input shaper that mitigates the oscillations arising from all of the pertinent modes of the linear portion of the lumped parameter system model:

$$T_0 \rightarrow T_{0Shaped} = T * I_1(t) * I_2(t) * \ldots * I_n(t) \quad \text{(Equation 18)}$$

where T is a torque output from the torque source (such as an EM) that would be applied without the presence of command shaping (e.g. a step function), and each I(t) term represents an input shaper designed to mitigate an oscillation frequency. In an example embodiment characterized by Equation 1, the input shaped component $T_0$ is set to the resulting shaped torque profile $T_{0Shaped}$.

Analysis of Results Based on Lumped Parameter Model of FIG. 2

In an example implementation, various methods and techniques described above can be applied to an ICE model representing a 1.3L inline 4-cylinder (I4) uniJet Turbo Diesel (JTD) engine produced cooperatively by Fiat and General Motors. Inertial torque of the ICE is neglected in this example implementation. The clutch is assumed to be disengaged to simulate static start or restart, and the EM and ICE coupling is defined to be a pre-transmission configuration, such as the Honda ISG. FIG. 2 represents the lumped parameter model used in calculations, and parameters associated with this model are chosen to be representative of a hypothetical, generic HEV.

Figure 3:
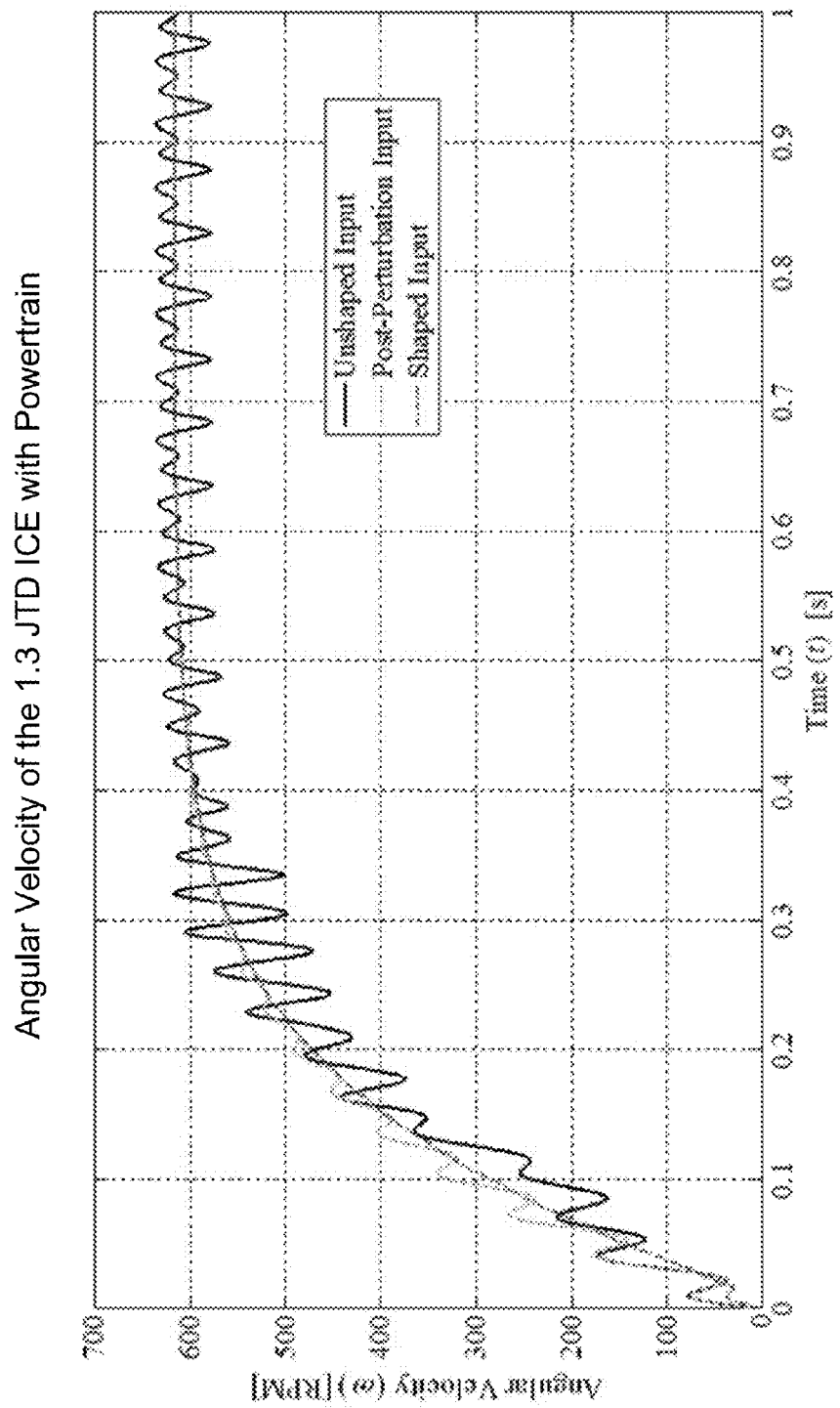
FIG. 3 illustrates angular velocity of a modeled ICE for various EM torque profiles.
Figure 4:
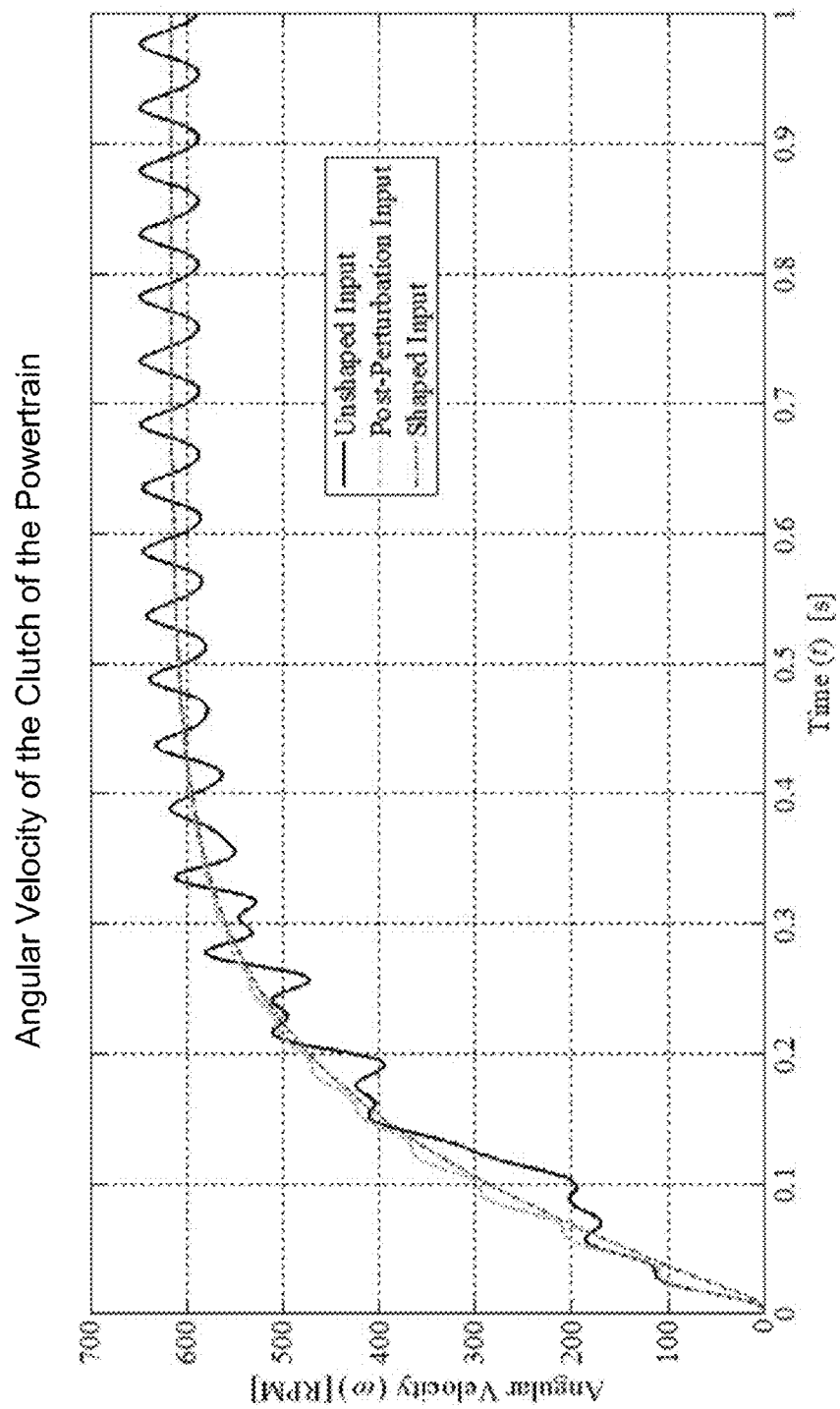
FIG. 4 illustrates angular velocity of a modeled clutch and powertrain for various EM torque profiles.

The graphical data representation of FIG. 3 shows the response of the modeled ICE 21 where the EM 22 provides an unshaped step-function constant torque during restart (solid black), the response of the ICE 21 where the EM 22 provides a torque profile that is the sum of the unshaped step-function and a non-linear component (dashed light grey), and the response of the ICE 21 where the EM 22 provides a torque profile that is the sum of a shaped input component and a non-linear component (dashed dark grey). Similarly, FIG. 4 shows the response of the modeled clutch 24 where the EM 22 provides unshaped input (solid black), sum of a non-linear component and unshaped input (dashed light grey), and the sum of a shaped input component and non-linear component (dashed dark grey) during ICE restart.

The non-linear behavior of the ICE is mitigated with the application of the non-linear component of the EM torque. With the mitigation of this behavior, the unwanted oscillations in the powertrain are reduced without command shaping. However, without applying command shaping, significant oscillations may persist in the chassis due to additional flexible poles of the system. A convolved (multi-mode) input shaper accounting for the dominant vibration frequencies of the chassis and powertrain may effectively prevent these oscillations from being felt by the driver. Considering the vibration modes of the powertrain and chassis systems may mitigate the unwanted oscillations to an acceptable level.

The methods described above are based on modeled physical parameters. It should be recognized that the effectiveness of the applied methodology may be diminished if physical parameters used in calculating the EM torque command signal are not equal to actual physical parameters. The effect of physical parameter variation was simulated for variations in the assumed initial crank angle, variations in cylinder geometry, and variations in friction parameters. It was found that inaccuracies in ICE friction parameters can cause substantial changes in steady-state ICE response, but the transient region important in ICE restart is only affected after 0.2 seconds.

Figure 5:
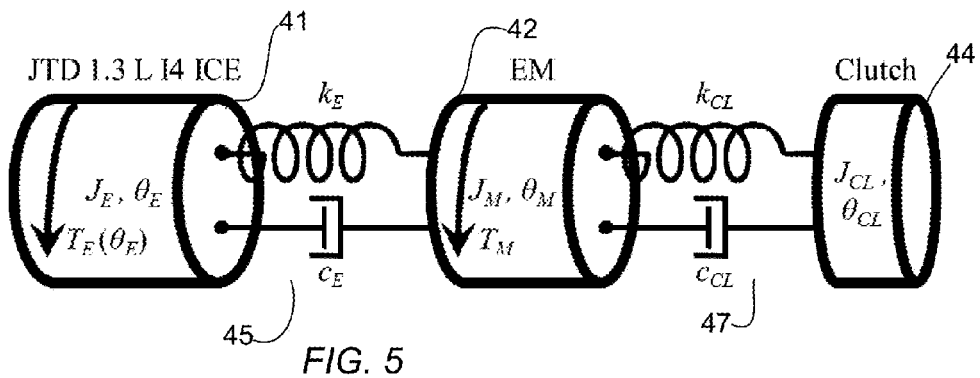
FIG. 5 depicts a lumped parameter model of a powertrain.
Figure 6:
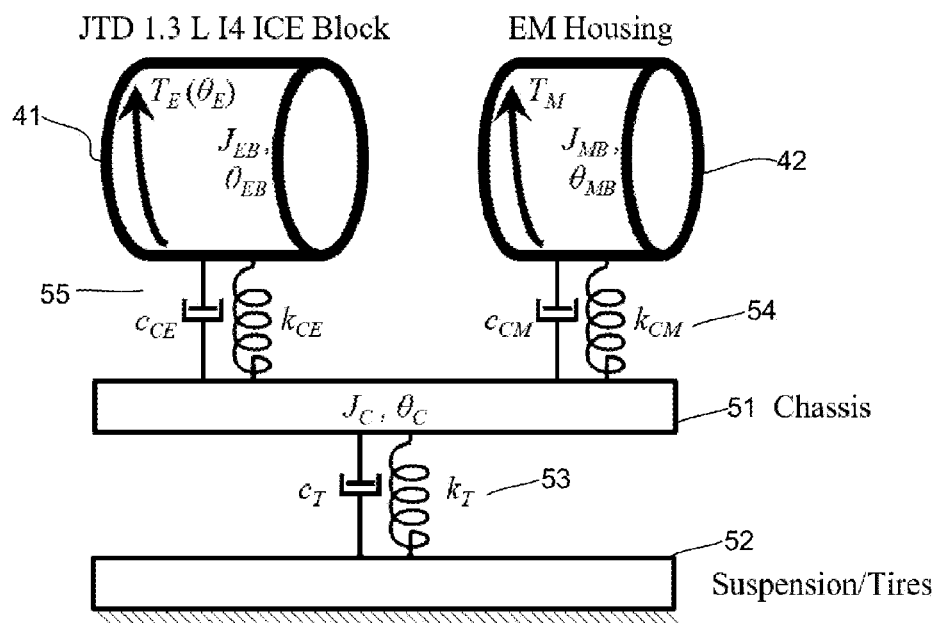
FIG. 6 depicts a lumped parameter model of a chassis and suspension.
Figure 7:
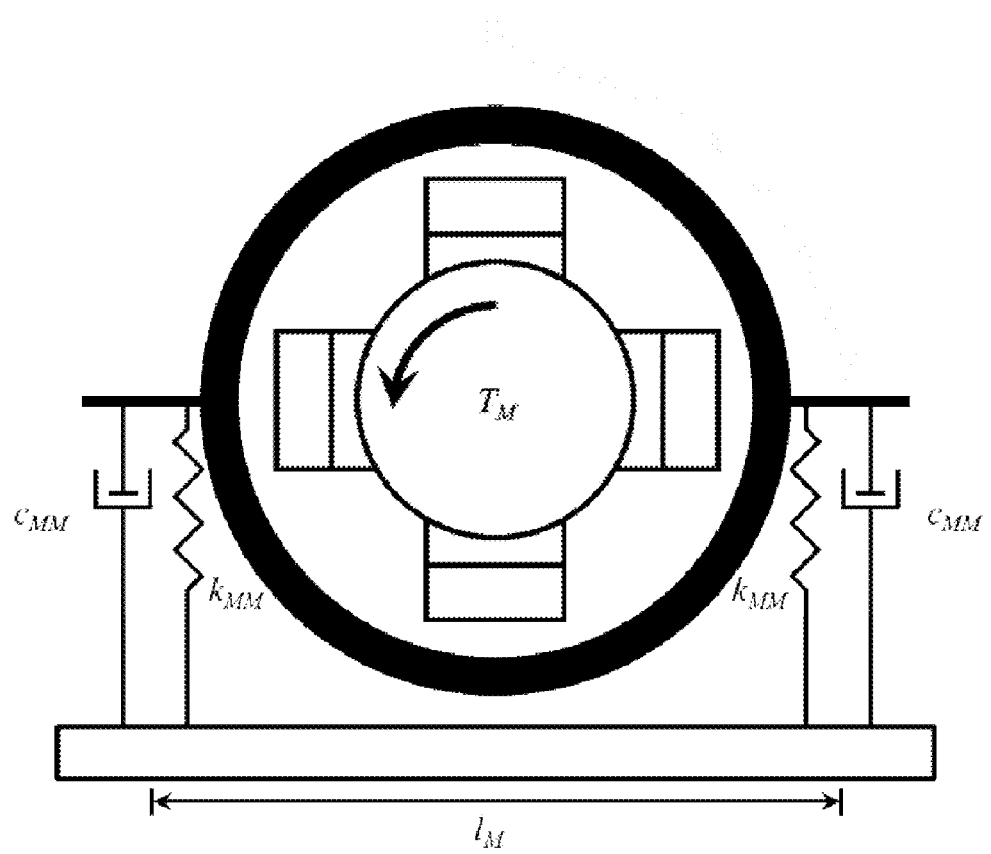
FIG. 7 depicts a lumped parameter model of a mounted EM.

Analysis of Results Based on Lumped Parameter Models of FIGS. 5, 6, and 7

In an example implementation, various methods and techniques described above may be applied to lumped parameter models shown in FIG. 5 and FIG. 6. The modeled ICE represents a 1.3L inline 4-cylinder (I4) uniJet Turbo Diesel (JTD) engine produced cooperatively by Fiat and General Motors. The cylinder of the ICE is modeled as shown in FIG. 1. The inertial torque is defined as:

$$T_{Inertial}(\theta_E) = rF_{Inertial}(\theta_E)\left(\sin\theta_E + \frac{\sin\theta_E \cos\theta_E}{\sqrt{R^2 - \sin^2\theta_E}}\right) \quad \text{(Equation 19)}$$

where $F_{Inertial}$ denotes the apparent force due to the ICE components in reciprocating motion.

The crank-slider mechanism of FIG. 1 can be used to define the acceleration of the piston head 13, giving inertial force:

$$F_{Inertial}(\theta_E) = M_{Inertial}\ddot{x} = M_{Inertial}\left(\frac{dx}{d\theta_E}\ddot{\theta}_E + \frac{d^2x}{d\theta_E^2}\dot{\theta}_E^2\right) \quad \text{(Equation 20)}$$

where $M_{Inertial}$ denotes the mass of ICE components in reciprocating motion.

In this example implementation, the clutch is assumed to be disengaged to simulate static start or restart, and the EM and ICE coupling 45 is defined to be a pre-transmission configuration, such as the Honda Integrated ISG. Model parameters for the 1.3L I4 JTD ICE are provided in Table 1.

TABLE 1

1.3 L JTD inline four-cylinder ICE model parameters

| Parameter | Value |
| --- | --- |
| Crank radius (r), m | 4.10E−02 |
| Connecting rod length (l), m | 7.18E−02 |
| Clearance volume ($V_C$), m$^3$ | 1.84E−05 |
| Cylinder bore (B), m | 6.96E−02 |
| Swept cylinder volume ($V_S$), m$^3$ | 3.12E−04 |
| Compression ratio ($C_R$), Unitless | 1.80E+01 |
| Angle between firing events ($\theta_{Optimal}$), ° | 1.80E+02 |
| Specific heat ratio ($\gamma$), Unitless | 1.36E+00 |
| Polytropic process constant (C), Pam$^{3\gamma}$ | 3.87E−02 |
| Start of premixed combustion ($\theta_{SOCP}$), ° | −1.60E+00 |
| Premixed combustion duration ($\Delta\theta_P$), ° | 5.24E+00 |
| Premixed combustion shape factor ($m_P$), Unitless | 1.41E+00 |
| Premixed combustion Wiebe correlation parameter ($a_P$), Unitless | 5.00E+00 |
| Mass of fuel injected during premixed combustion ($m_{iP}$), kg | 8.00E−06 |
| Fraction of fuel burned during premixed combustion ($x_{jP}$), Unitless | 3.30E−01 |
| Start of main combustion ($\theta_{SOCM}$), ° | 1.89E+00 |
| Main combustion duration ($\Delta\theta_M$), ° | 5.24E+00 |

TABLE 1-continued 1.3 L JTD inline four-cylinder ICE model parameters

| Parameter | Value |
|---|---|
| Main combustion shape factor ($m_M$), Unitless | 1.09E+00 |
| Main combustion Wiebe correlation parameter ($a_M$), Unitless | 5.00E+00 |
| Mass of fuel injected during main combustion ($m_{iM}$), kg | 8.00E−06 |
| Fraction of fuel burned during main combustion ($x_{fM}$), Unitless | 1.40E−01 |
| Start of diffusive combustion ($\theta_{SOCD}$), ° | 3.39E+00 |
| Diffusive combustion duration ($\Delta\theta_D$), ° | 4.42E+01 |
| Diffusive combustion shape factor ($m_D$), Unitless | 2.10E−01 |
| Diffusive combustion Wiebe correlation parameter ($a_D$), Unitless | 5.00E+00 |
| Mass of fuel injected during diffusive combustion ($m_{iD}$), kg | 8.00E−06 |
| Fraction of fuel burned during diffusive combustion ($x_{fD}$), Unitless | 5.70E−01 |
| Lower heating value of the diesel fuel (LHV), J/kg | 42.5E+06 |
| Ambient Pressure ($p_{Ambient}$), Pa | 1.01E+05 |
| ICE reciprocating component mass ($M_{Inertial}$), kg | 2.29E−01 |
| Constant friction torque coefficient ($T_{Friction_0}$), Nm | 8.75E−02 |
| Pressure friction torque coefficient ($k_p$), Nm/Pa | 1.25E−06 |
| First-order angular velocity friction torque coefficient ($k_{\omega 1}$), Nms/rad | 6.75E−02 |
| Second-order angular velocity friction torque coefficient ($k_{\omega 2}$), Nms²/rad² | 1.80E−03 |

The model shown in FIG. 5 consists of an ICE 41, an EM 42, a connecting shaft between the ICE and EM 45, a clutch 44, and a connecting shaft between the EM and clutch 47. The following dynamic model can be written for the system shown in FIG. 5:

$$\begin{bmatrix} J_E & 0 & 0 \\ 0 & J_M & 0 \\ 0 & 0 & J_{CL} \end{bmatrix} \begin{bmatrix} \ddot{\theta}_E \\ \ddot{\theta}_M \\ \ddot{\theta}_{CL} \end{bmatrix} + \begin{bmatrix} c_E & -c_E & 0 \\ -c_E & c_E+c_{CL} & -c_{CL} \\ 0 & -c_{CL} & c_{CL} \end{bmatrix} \begin{bmatrix} \dot{\theta}_E \\ \dot{\theta}_M \\ \dot{\theta}_{CL} \end{bmatrix} + \begin{bmatrix} k_E & -k_E & 0 \\ -k_E & k_E+k_{CL} & -k_{CL} \\ 0 & -k_{CL} & k_{CL} \end{bmatrix} \begin{bmatrix} \theta_E \\ \theta_M \\ \theta_{CL} \end{bmatrix} = \begin{bmatrix} T_E(\theta_E) \\ T_M \\ 0 \end{bmatrix}$$

(Equation 21)

where $J_E$, $J_M$, and $J_{CL}$ denote the equivalent moments of inertia for the crankshaft and counterbalances, EM rotor, and driven plate assembly of the clutch, respectively. Indicated torque from the ICE and EM act as inputs to the dynamic system shown in Equation 21. In Equation 21, the state vector consists of the absolute rotational degrees of freedom for the EM 42, ICE 41, and clutch 44.

The model shown in FIG. 6 is used to represent the coupling between the EM stator and ICE block with the chassis and suspension. This model consists of the ICE 41, the EM 42, a chassis 51, a mechanical coupling of the ICE to chassis 53, a mechanical coupling of the EM to the chassis 54, a suspension and tires 52, and a mechanical coupling between the chassis and suspension and tires 53, a mechanical coupling between the EM housing and chassis 54, and a mechanical coupling between the ICE block and chasses 55. The model shown in FIG. 6 allows for flexible poles downstream of the ICE to be included in the mitigation of unwanted vibrations in the powertrain. Indicated torque from the ICE 41 and EM 42 act as an external excitation to the model, since they are the equal and opposite reactionary torques applied to the crankshaft and EM rotor. The dynamic model for the system shown in FIG. 6 is then:

$$\begin{bmatrix} J_{EB} & 0 & 0 \\ 0 & J_{MB} & 0 \\ 0 & 0 & J_C \end{bmatrix} \begin{bmatrix} \ddot{\theta}_{EB} \\ \ddot{\theta}_{MB} \\ \ddot{\theta}_C \end{bmatrix} +$$

$$\begin{bmatrix} c_{CE} & 0 & -c_{CE} \\ 0 & c_{CM} & -c_{CM} \\ -c_{CE} & -c_{CM} & c_{CE}+c_{CM}+c_T \end{bmatrix} \begin{bmatrix} \dot{\theta}_{EB} \\ \dot{\theta}_{MB} \\ \dot{\theta}_C \end{bmatrix} +$$

$$\begin{bmatrix} k_{CE} & 0 & -k_{CE} \\ 0 & k_{CM} & -k_{CM} \\ -k_{CE} & -k_{CM} & k_{CE}+k_{CM}+k_T \end{bmatrix} \begin{bmatrix} \theta_{EB} \\ \theta_{MB} \\ \theta_C \end{bmatrix} = \begin{bmatrix} -T_E(\theta_E) \\ -T_M \\ 0 \end{bmatrix}$$

(Equation 22)

where $J_{EB}$ and $J_{MB}$ are the moments of inertia of the ICE block and housing of the EM, respectively. $J_C$ is the roll equivalent moment of inertia for the chassis.

The state vector of Equation 22 contains the rotational degrees of freedom of the engine block, EM housing, and chassis. Alternatively, a modal model could be employed with appropriate chassis modes. This approach is not pursued herein, but would result in similar matrix equations with (potentially) higher dimension.

Damping and stiffness values representing the coupling between the chassis and the EM are calculated from the approximate EM geometry and its mounts as shown in FIG. 7.

Given mount rectilinear damping and stiffness ($c_{MM}$ and $k_{MM}$, respectively), the $$\frac{l_M^2 c_{MM}}{2} \text{ and } \frac{l_M^2 k_{MM}}{2},$$

torsional damping and stiffness values ($C_{CM}$ and $k_{CM}$) are expressed as $$\frac{l_E^2 c_{ME}}{2} \text{ and } \frac{l_E^2 k_{ME}}{2},$$

respectively. Analogous expressions follow for the ICE such that $c_{CE}$ and $k_{CE}$ are given as respectively. The damping and stiffness values ($c_T$ and $k_T$) representing the suspension and tires are based on vehicle roll stiffness.

Table 2 provides representative numerical values for the model parameters detailed above. The stiffness parameters for the powertrain are obtained using a powertrain CAD model of the General Motors Alpha platform and general material data. A flexible coupling is used between the EM and the clutch of the vehicle for the powertrain analyzed, which defines the $k_{CL}$ and $C_{CL}$ values.

TABLE 2

Torsional powertrain model parameters

| Parameter | Value |
|---|---|
| Moment of inertia of the ICE crankshaft ($J_E$), kgm² | 1.08E−01 |
| Moment of inertia of the EM rotor ($J_M$), kgm² | 9.00E−02 |
| Approximate moment of inertia of the driven plate assembly of the clutch ($J_{CL}$), kgm² | 5.20E−02 |
| Diameter of the clutch ($d_{CL}$), m | 1.85E−01 |
| Mass of the clutch ($m_{CL}$), kg | 1.21E+01 |
| Stiffness element between EM and driven plate | 2.20E+03 |

TABLE 2-continued

Torsional powertrain model parameters

| Parameter | Value |
|---|---|
| assembly of clutch ($k_{CL}$), Nm/rad | |
| Diameter of the rotor of the EM ($d_R$), m | 3.00E−01 |
| Thickness of the rotor of the EM ($t_R$), m | 5.00E−02 |
| Rotor mass ($m_R$), kg | 8.00E+00 |

Table 3 provides the numerical values used in the analyses for the system governing chassis motion. The moments of inertia of the engine block and EM housing are approximated using the mass specified by the manufacturer and assuming simple geometric shapes represent them.

TABLE 3

Chassis motion model parameters

| Parameter | Value |
|---|---|
| Approximate moment of inertia of the ICE block ($J_{EB}$), kgm² | 7.29E+00 |
| Approximate moment of inertia of the EM housing ($J_{MB}$), kgm² | 8.87E−01 |
| Moment of inertia representing the chassis ($J_C$), kgm² | 3.65E+02 |
| Mass of the ICE block ($m_{EB}$), kg | 1.30E+02 |
| Mass of the EM housing ($m_{MB}$), kg | 3.80E+01 |
| Width of the ICE ($l_E$), m | 5.00E−01 |
| Height of the ICE ($h_E$), m | 6.50E−01 |
| Diameter of the EM ($d_M$), m | 4.32E−01 |
| Stiffness element representing ICE/EM mounts ($k_{CE}/k_{CM}$), Nm/rad | 4.29E+04 |
| Stiffness element representing suspension and tires ($k_T$), Nm/rad | 7.56E+04 |
| Damping element representing suspension and tires ($c_T$), Nms/rad | 4.48E+03 |

In the example implementation, the EM and ICE coupling is defined to be a pre-transmission configuration, such as the Honda ISG. In this implementation, with the pre-transmission configuration, the coupling between the EM and ICE is be approximated as being rigid with negligible damping and the EM is assumed to be mounted with the same mounts as the ICE, which defines the values $k_E$, $c_E$, $k_{CM}$, and $c_{CM}$. For the purposes of calculation of the example implementation, proportional damping matrices based on available parameter values are used.

The example implementation takes into account effects of friction. As such, Equation 12 may be rewritten, with the degrees of freedom of the ICE and EM combined since their coupling is rigid:

$$\ddot{\theta}_E = \frac{T_0 + \varepsilon T_1(t)}{J_E + J_M} + \frac{\varepsilon}{J_E + J_M}\left(rA_p(p(\theta_E) - p_{Ambient})\left(\sin\theta_E + \frac{\sin\theta_E \cos\theta_E}{\sqrt{R^2 - \sin^2\theta_E}}\right)\right) - \frac{T_{Friction}(\theta_E)}{J_E + J_M} + \frac{c_{CL}}{J_E + J_M}(\dot{\theta}_{CL} - \dot{\theta}_E) + \frac{k_{CL}}{J_E + J_M}(\theta_{CL} - \theta_E).$$
(Equation 23)

The friction torque component is defined at the zero-order, $\varepsilon^0$, scale. Defining the friction torque at the zero-order scale reduces the dynamic torque component, $T_1$, required from the EM without decreasing the impact of the strategy and improves stability characteristics. As a result, the zeroth-order equation following scale separation of $\theta_E$ previously presented in Equation 14 may be rewritten:

$$\ddot{\theta}_0 = \frac{T_0}{J_E + J_M} - \frac{T_{Friction}(\theta_0)}{J_E + J_M} + \frac{c_{CL}}{J_E + J_M}(\dot{\theta}_{CL} - \dot{\theta}_E) + \frac{k_{CL}}{J_E + J_M}(\theta_{CL} - \theta_E)$$
(Equation 24)

Because the friction torque is defined at the zero-order scale for the purposes of this example implementation, the first-order approximation for $\theta_E$ previously presented in Equation 15 is applied to this example. This example implementation therefore utilizes Equation 16 as the non-linear component of EM torque.

Applying a convolved (multi-mode) ZV input shaper following Equations 17 and 18 to a step function input T, Table 4 provides the natural frequencies and damping ratios for command shaping the systems' flexible modes for this example implementation. Note that four total impulses are used to address two flexible poles: one for the powertrain and one for the chassis. In other implementations, higher fidelity models composed of a larger number of flexible poles may require more impulses depending on the number of frequencies deemed to adversely affect drivability.

TABLE 4

Natural frequencies and damping ratios for the powertrain and chassis subsystems

| Parameter | Value |
|---|---|
| Powertrain subsystem natural frequency ($\omega_{np}$), rad/s | 2.32E+02 |
| Powertrain subsystem damping ratio ($\zeta_p$), Unitless | 2.32E−02 |
| Chassis subsystem natural frequency ($\omega_{nc}$), rad/s | 1.42E+01 |
| Chassis subsystem damping ratio ($\zeta_c$), Unitless | 3.55E−01 |

Figure 8:
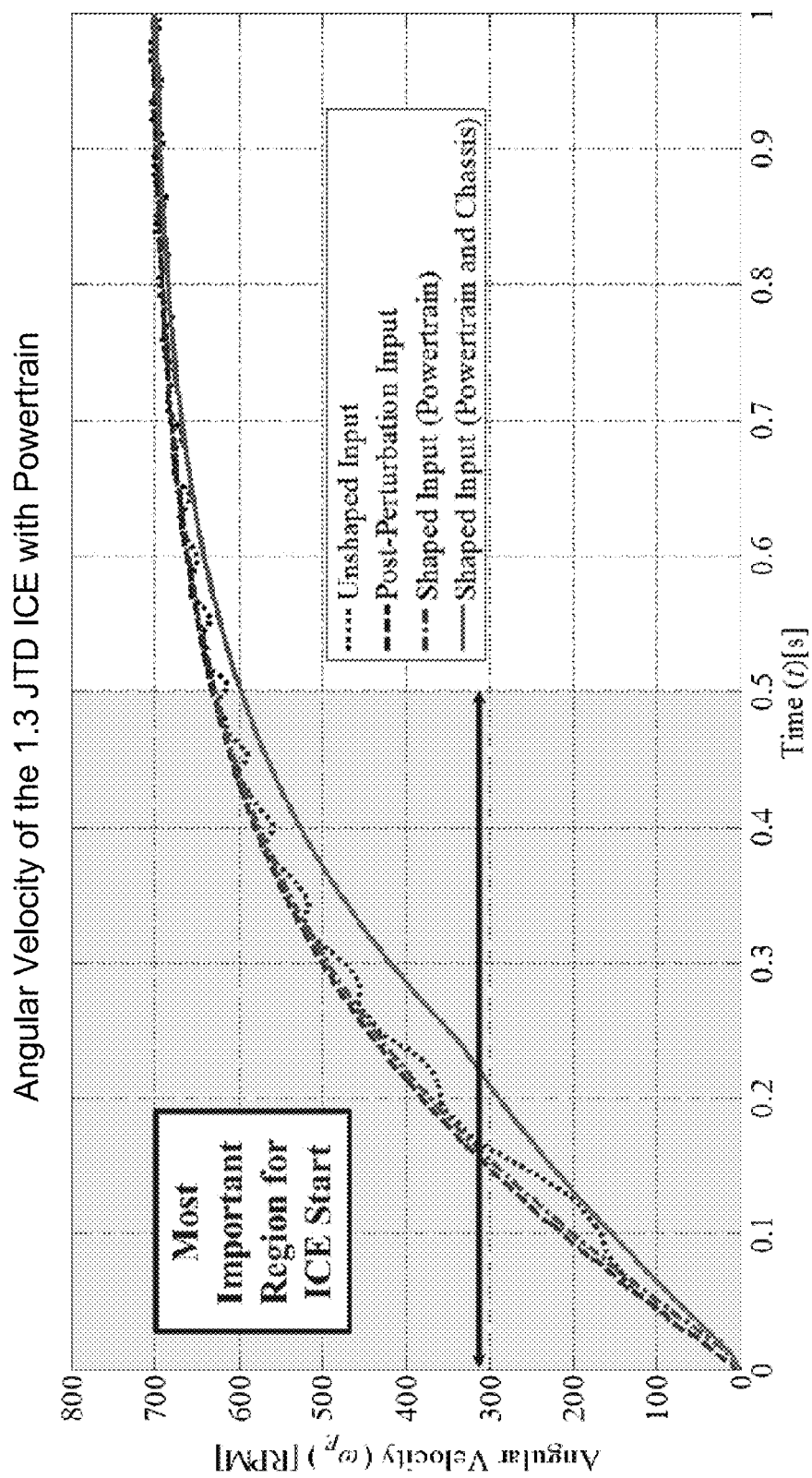
FIG. 8 illustrates angular velocity of a modeled ICE with powertrain for various EM torque profiles.

FIGS. 8-11 illustrate simulated results from the application of the example implementation utilizing the models represented by FIGS. 5-7 and described above. FIG. 8 illustrates the ICE response from an EM torque that is an unshaped step input (dotted), post-perturbation input (dashed), and a shaped input with the tailored multi-mode ZV shaper designed for either (a) the vibration frequencies for the powertrain system alone (dot-dash), or (b) the frequencies for both powertrain and chassis subsystems (solid). The first 0.5 seconds of FIG. 8 is highlighted since this transient response region is most relevant for ICE restart.

Figure 9:
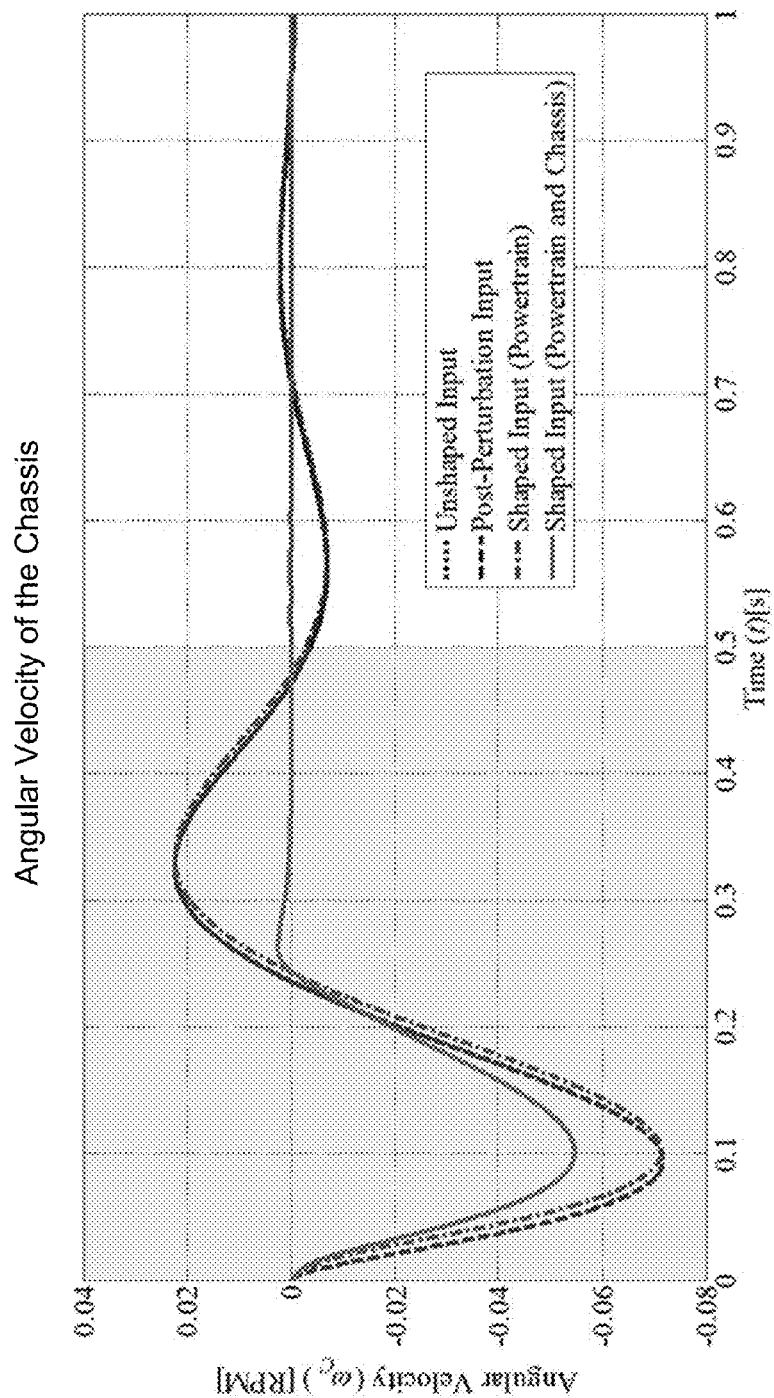
FIG. 9 illustrates angular velocity of a modeled chassis for various EM torque profiles.
Figure 10:
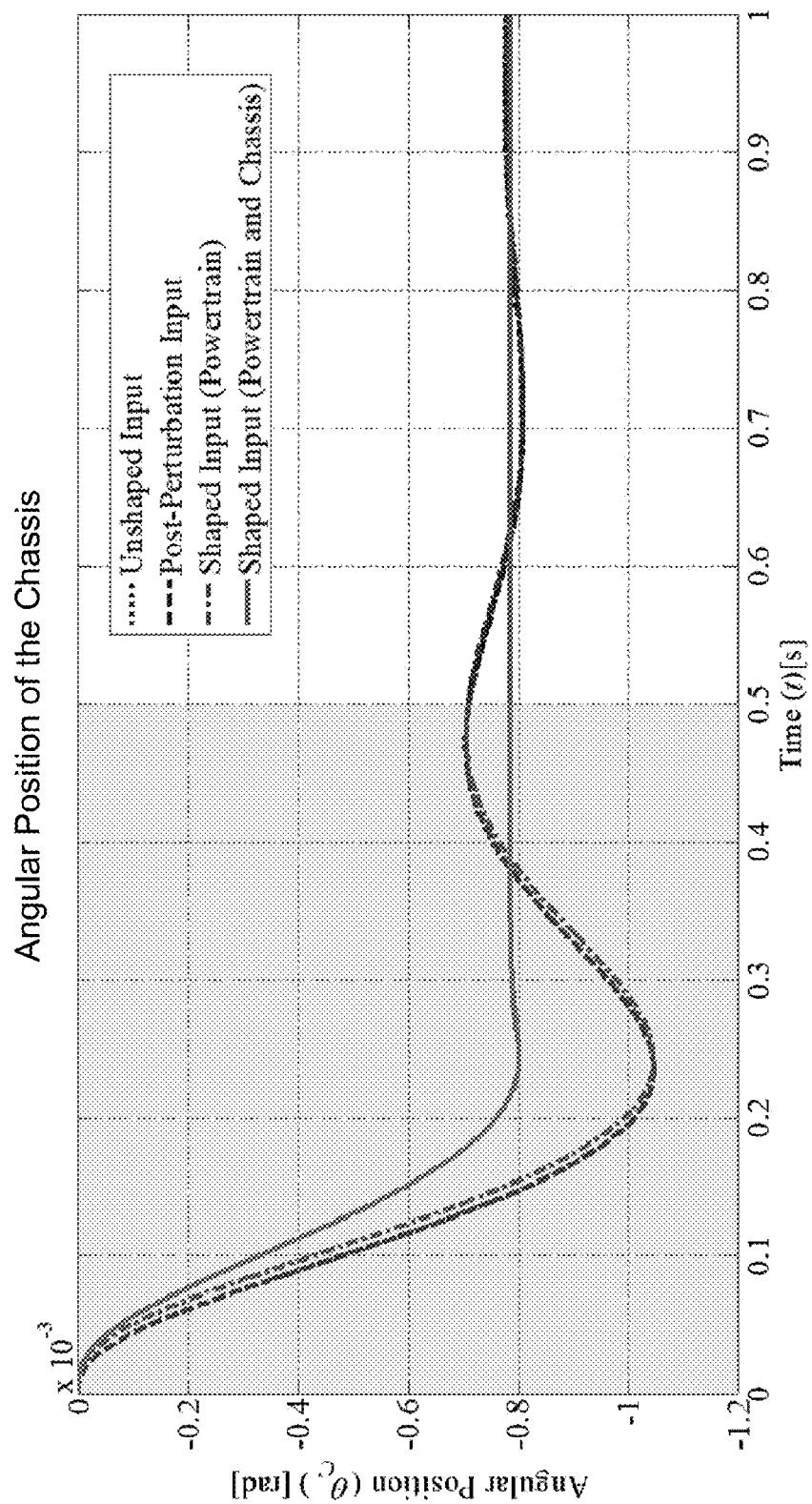
FIG. 10 illustrates angular position of a modeled chassis for various EM torque profiles.

Applying the non-linear EM torque component $T_1$ together with an unshaped constant torque component, which is denoted as the post-perturbation input (dashed), results in substantial reduction of the unwanted ICE oscillations. However, oscillations remain in the chassis due to the excitation of the subsystem's flexible poles, as demonstrated in FIG. 9 (chassis angular velocity) and FIG. 10 (chassis angular position). In FIG. 9 and FIG. 10, the unshaped input (dotted) curve is indistinguishable from the post-perturbation input (dashed). Applying a shaped input that accounts for the powertrain only (dot-dash) results in minimal change in angular velocity (FIG. 9) or angular position (FIG. 10) of the chassis.

Oscillations of the chassis are sensed by the vehicle's driver and passengers, and are associated with decreased drivability. As expected, shaping the input based on the flexible poles of the powertrain system alone is not effective in mitigating the chassis oscillations. A convolved input shaper accounting for both the chassis and powertrain flexible poles (solid) may effectively mitigate oscillations of the chassis sensed by the driver and passengers.

Figure 11:
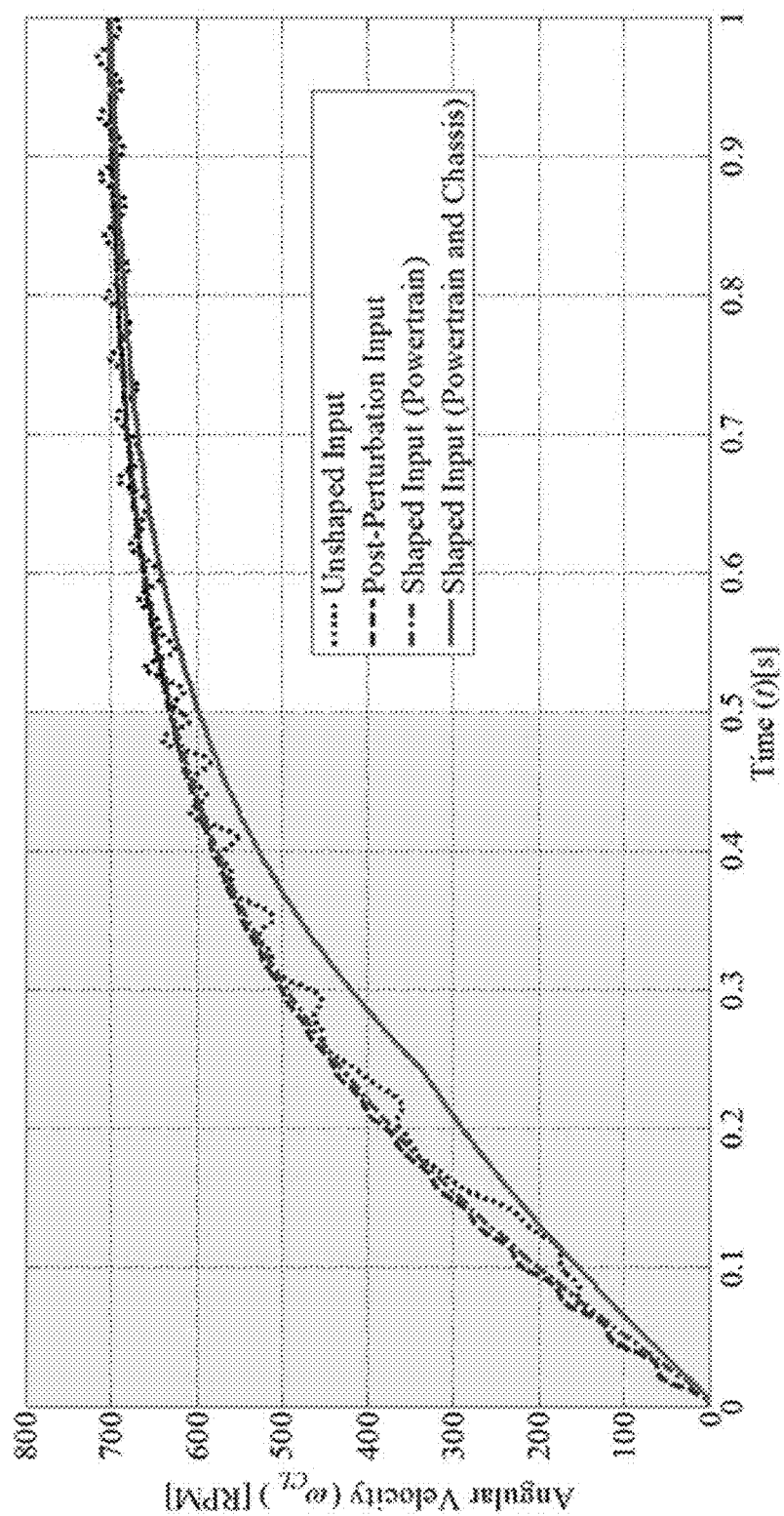
FIG. 11 illustrates angular velocity of a driven plate assembly of a clutch of a powertrain for various EM torque profiles.

The strategy developed may also be effective in mitigating drivetrain component oscillations. FIG. 11 depicts the clutch response during ICE restart using unshaped (dotted), post-perturbation (dashed), shaped input considering powertrain vibration modes only (dot-dash), and shaped input considering powertrain and chassis vibration modes (solid). With the TSCS strategy, the clutch oscillations are effectively mitigated when the flexible poles of the powertrain are included in command shaping (dot-dash).

Example implementations described thus far assume an ideal torque source, which must ultimately be implemented using an electric machine, hydraulic motor, or other actuator. Utilizing the models illustrated in FIGS. 5-7 as described above, the effectiveness of the strategy when implementing a conventional DC electric motor is also assessed.

Figure 12:
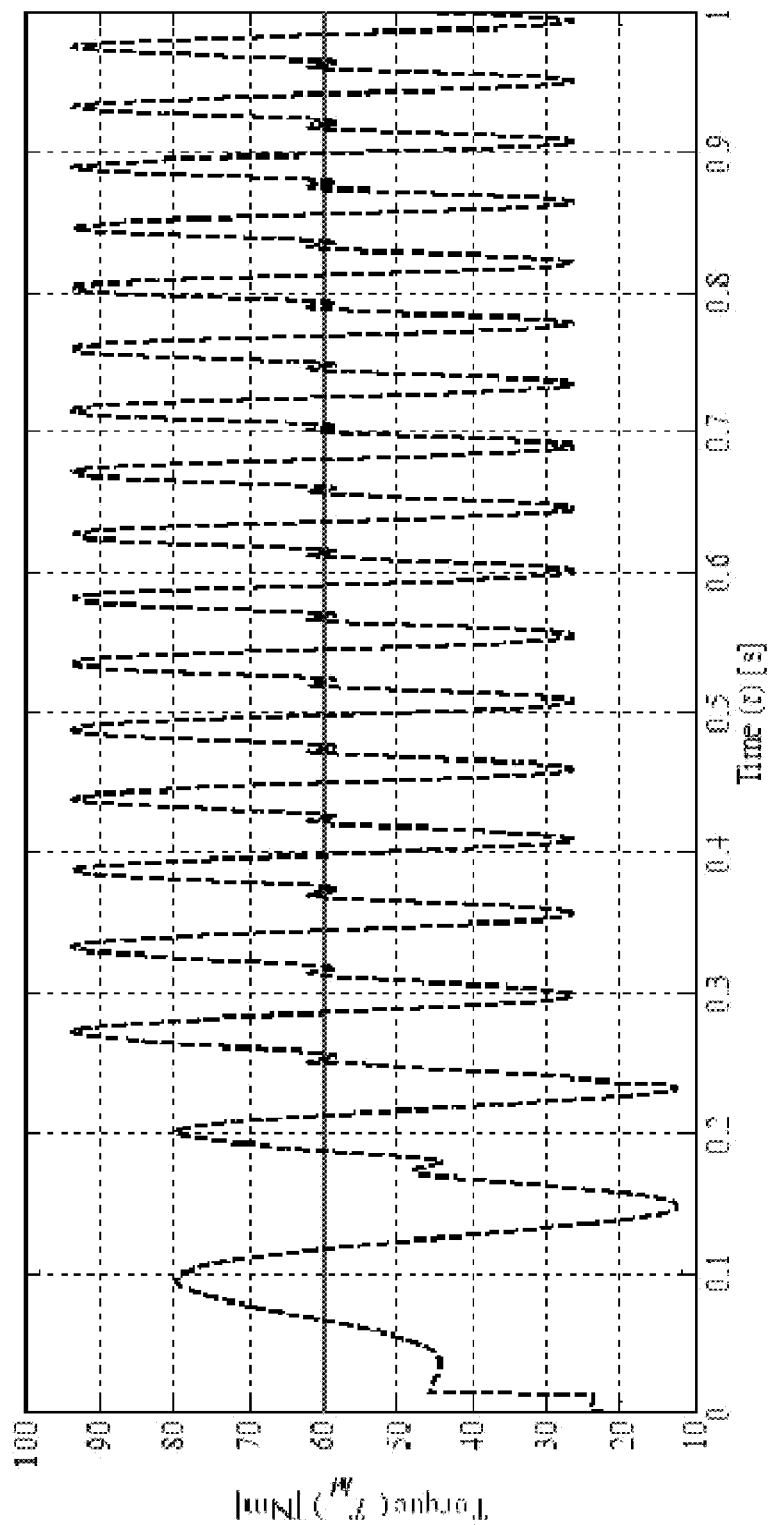
FIG. 12 illustrates a modeled EM torque profile.

FIG. 12 illustrates an example EM torque profile based on an applied example of TSCS (dashed) compared to an unshaped step input having a torque of 60 Newton meters (Nm) (solid).

Figure 13:
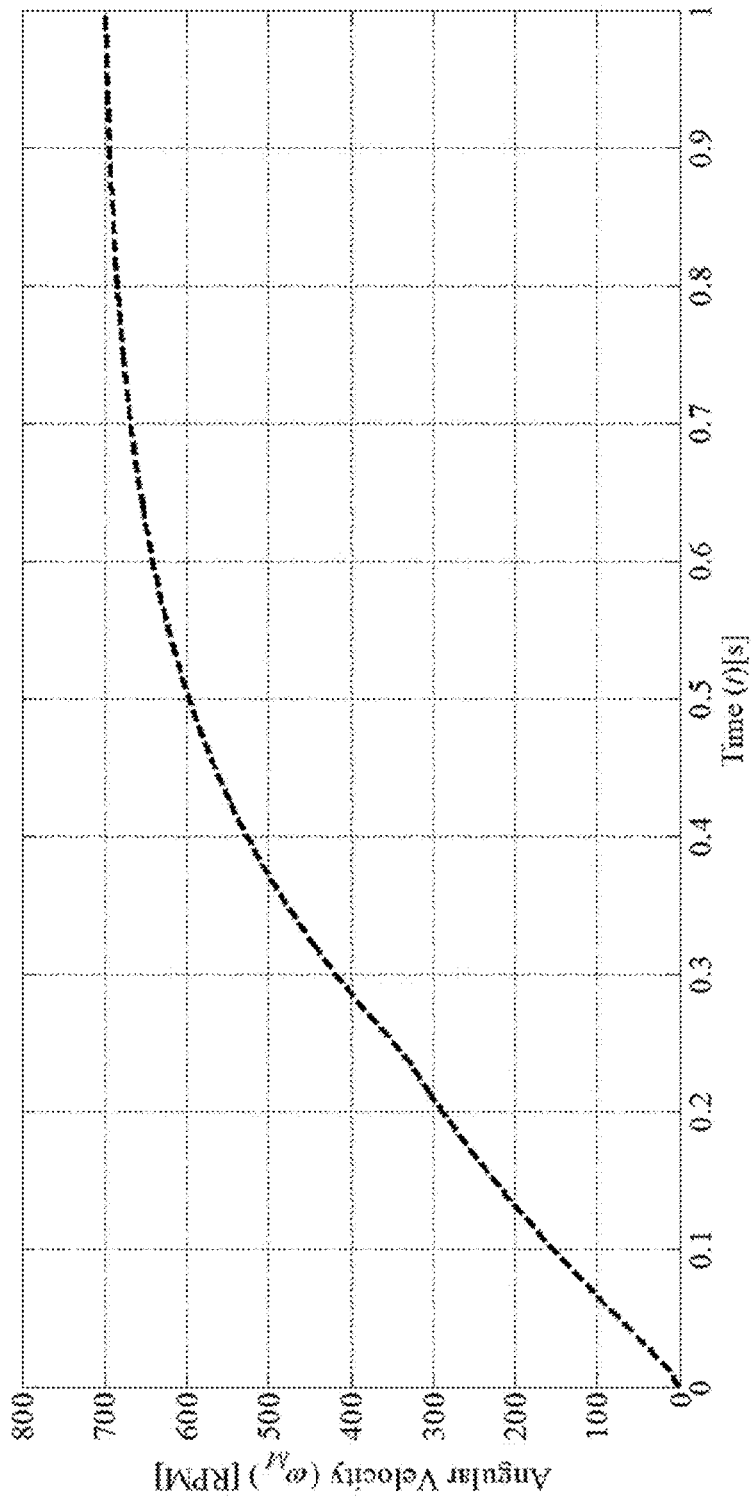
FIG. 13 illustrates a modeled EM speed profile.

An example speed profile designed to mitigate the drivetrain and chassis oscillations is presented in FIG. 13. Observing the EM torque profile in FIG. 12, the dominant frequency content contains 21.97 Hz, 45.78 Hz, and 68.97 Hz. The mechanical time constant of the EM due to its inertia is lumped together with the ICE in the previously presented plots. Mechanical time constants for a typical DC motor are on the order of 10 milliseconds, which imply that any frequency content approaching 100 Hz will be reaching the EM operating limit. The electrical time constant for an electric motor is characteristically an order of magnitude faster than the mechanical time constant. Therefore, a standard EM for HEVs should be compatible with the two-scale command shaping strategy proposed herein.

In another example implementation, to explore further the impact of implementing an EM, a permanent magnet DC motor model was coupled to the existing equations of motion presented in Equations 21 and 22. Equation 25 provides a differential equation that governs the EM armature circuit behavior and Equation 26 defines the EM dynamics and torque for this example:

$$L_a \frac{di_a}{dt} + R_a i_a + K_b \dot{\theta}_M = V_A \quad \text{(Equation 25)}$$

$$J_M \ddot{\theta}_M + c_{Internal}\dot{\theta}_M = K_t i_a - c_E(\dot{\theta}_M - \dot{\theta}_E) - \\ k_E(\theta_M - \theta_E) - c_{CL}(\dot{\theta}_M - \dot{\theta}_{CL}) - k_{CL}(\theta_M - \theta_{CL}) \quad \text{(Equation 26)}$$

where $L_a$ denotes the impedance in the armature circuit, $R_A$ the resistance in the armature circuit, $K_b$ the electromotive force constant, $K_t$ the torque constant, and $c_{Internal}$ the internal damping.

Table 5 provides the parameter values used in this example that define the permanent magnet DC motor model and its coupling with the ICE. The remaining parameters for the model are reported in Tables 1 through 3.

TABLE 5

Permanent magnet DC motor model parameters

| Parameter | Value |
|---|---|
| Impedance of armature circuit ($L_a$), H [41] | 1.00E−01 |
| Resistance of armature circuit ($R_a$), Ω [41] | 5.00E−02 |

TABLE 5-continued

Permanent magnet DC motor model parameters

| Parameter | Value |
|---|---|
| Internal damping of EM ($c_{Internal}$), Nms/rad [41] | 1.75E+00 |
| Electromotive force constant of EM ($K_b$), Vs/rad [41] | 5.00E−01 |
| Torque constant of EM ($K_t$), Nm/A [41] | 2.80E+00 |
| Stiffness element between ICE and EM ($k_E$), Nm/rad [24] | 5.30E+08 |

Including the electromechanically coupled equations in the original equations of motion results in the torque input in the original system being replaced by a voltage command in the armature circuit along with the corresponding armature current:

$$\begin{bmatrix} J_E & 0 & 0 & 0 \\ 0 & J_M & 0 & 0 \\ 0 & 0 & J_{CL} & 0 \\ 0 & 0 & 0 & L_A \end{bmatrix} \begin{bmatrix} \ddot{\theta}_E \\ \ddot{\theta}_M \\ \ddot{\theta}_{CL} \\ \ddot{q}_A \end{bmatrix} + \quad \text{(Equation 27)}$$

$$\begin{bmatrix} c_E & -c_E & 0 & 0 \\ -c_E & c_E+c_{CL}+c_{Internal} & -c_{CL} & -K_t \\ 0 & -c_{CL} & c_{CL} & 0 \\ 0 & K_b & 0 & R_a \end{bmatrix} \begin{bmatrix} \dot{\theta}_E \\ \dot{\theta}_M \\ \dot{\theta}_{CL} \\ \dot{q}_A \end{bmatrix} +$$

$$\begin{bmatrix} k_E & -k_E & 0 & 0 \\ -k_E & k_E+k_{CL} & -k_{CL} & 0 \\ 0 & -k_{CL} & k_{CL} & 0 \\ 0 & 0 & 0 & 0 \end{bmatrix} \begin{bmatrix} \theta_E \\ \theta_M \\ \theta_{CL} \\ q_A \end{bmatrix} = \begin{bmatrix} T_E(\theta_E) \\ 0 \\ 0 \\ V_A \end{bmatrix}$$

where the armature voltage $V_A$ is decomposed into a linear combination of constant and time-varying terms:

$$V_A = V_0 + V_1(t) \quad \text{(Equation 28)}$$

using the same techniques developed previously for the shaped EM torque profile. The state vector of Equation 27 contains the charge in the armature circuit $q_A$, or integral of the current $i_A$, as well as the ICE, EM, and clutch rotational degrees of freedom.

Figure 14:
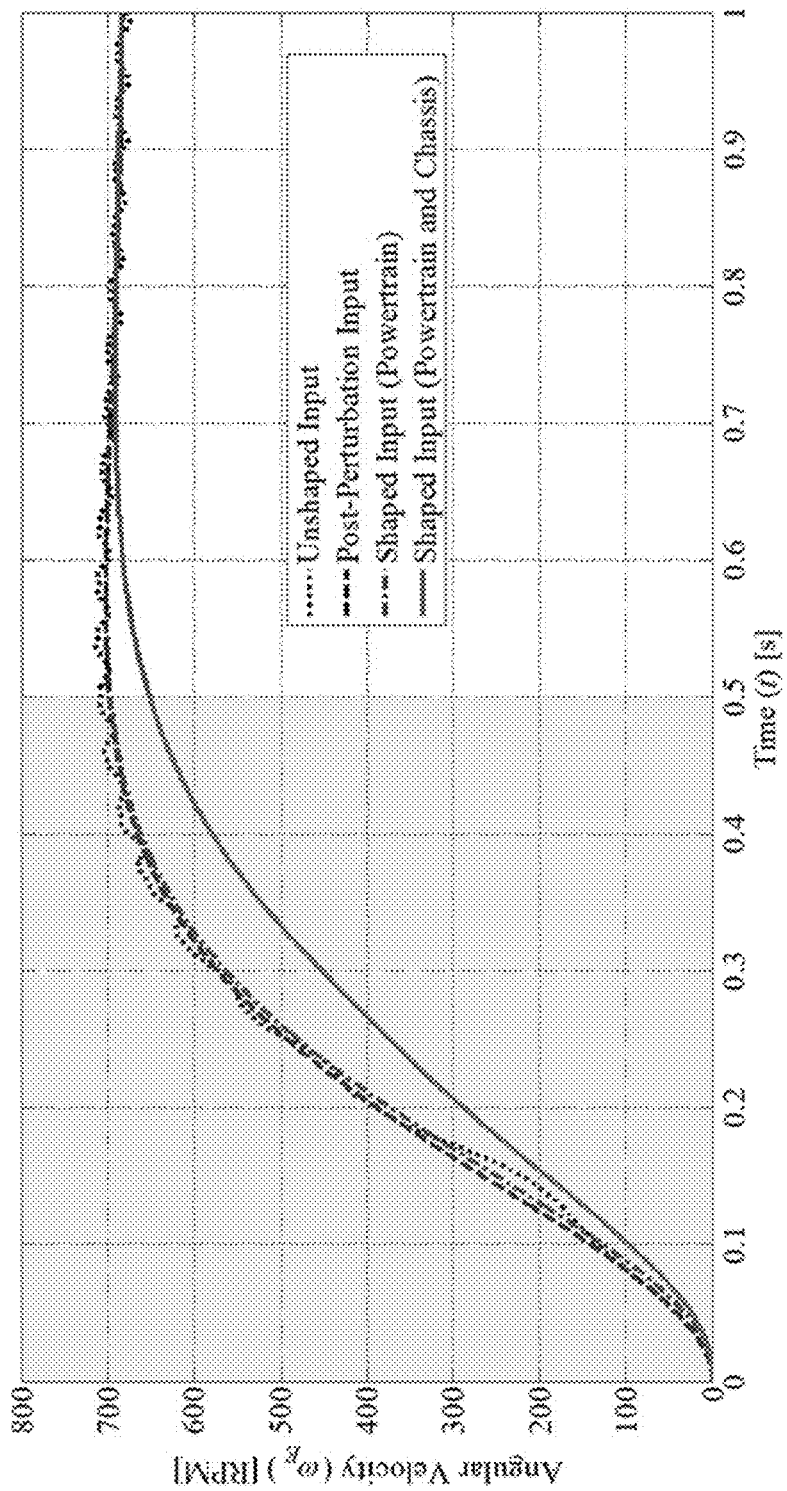
FIG. 14 illustrates angular velocity of a modeled ICE for various EM torque profiles.
Figure 15:
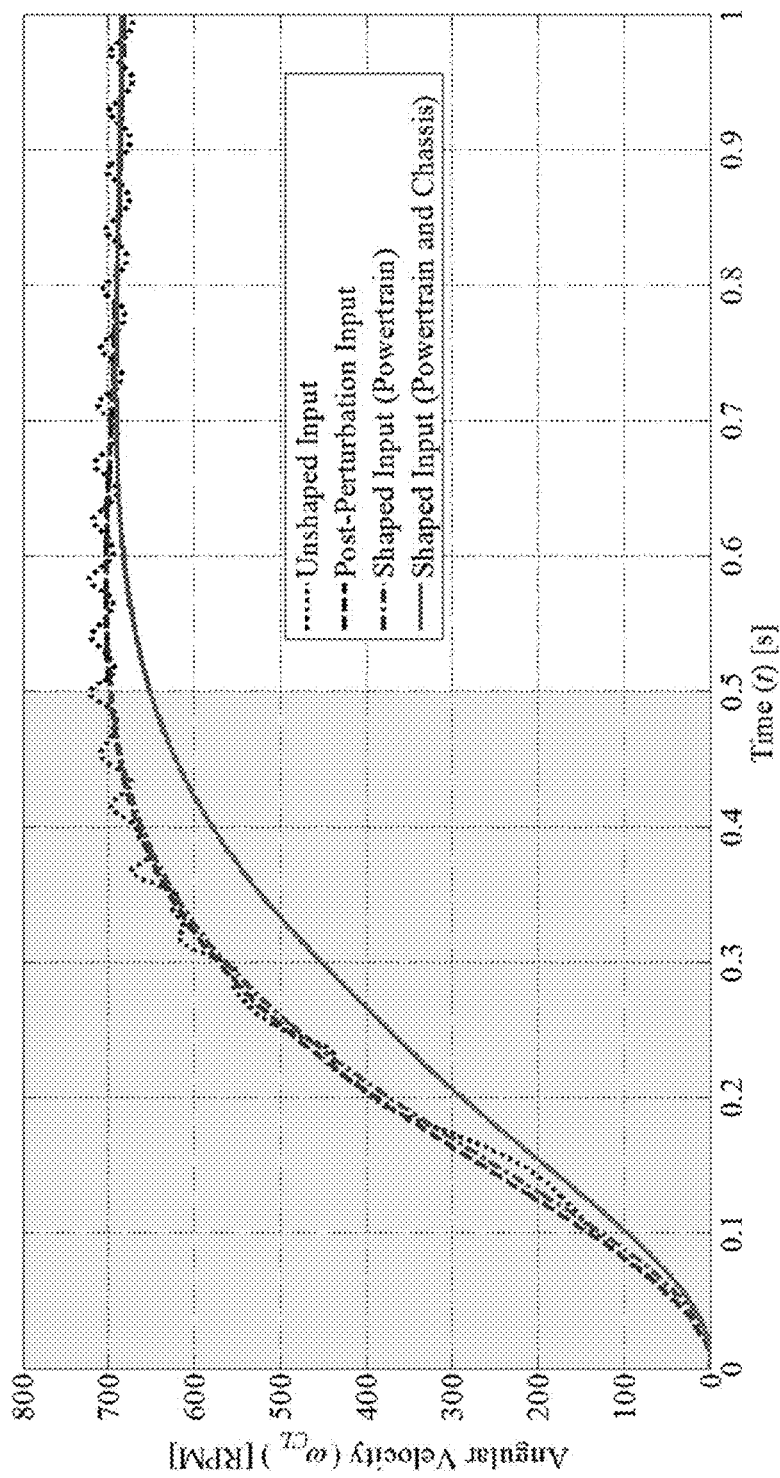
FIG. 15 illustrates angular velocity of a modeled driven plate assembly of a clutch of a powertrain for various EM torque profiles.
Figure 16:
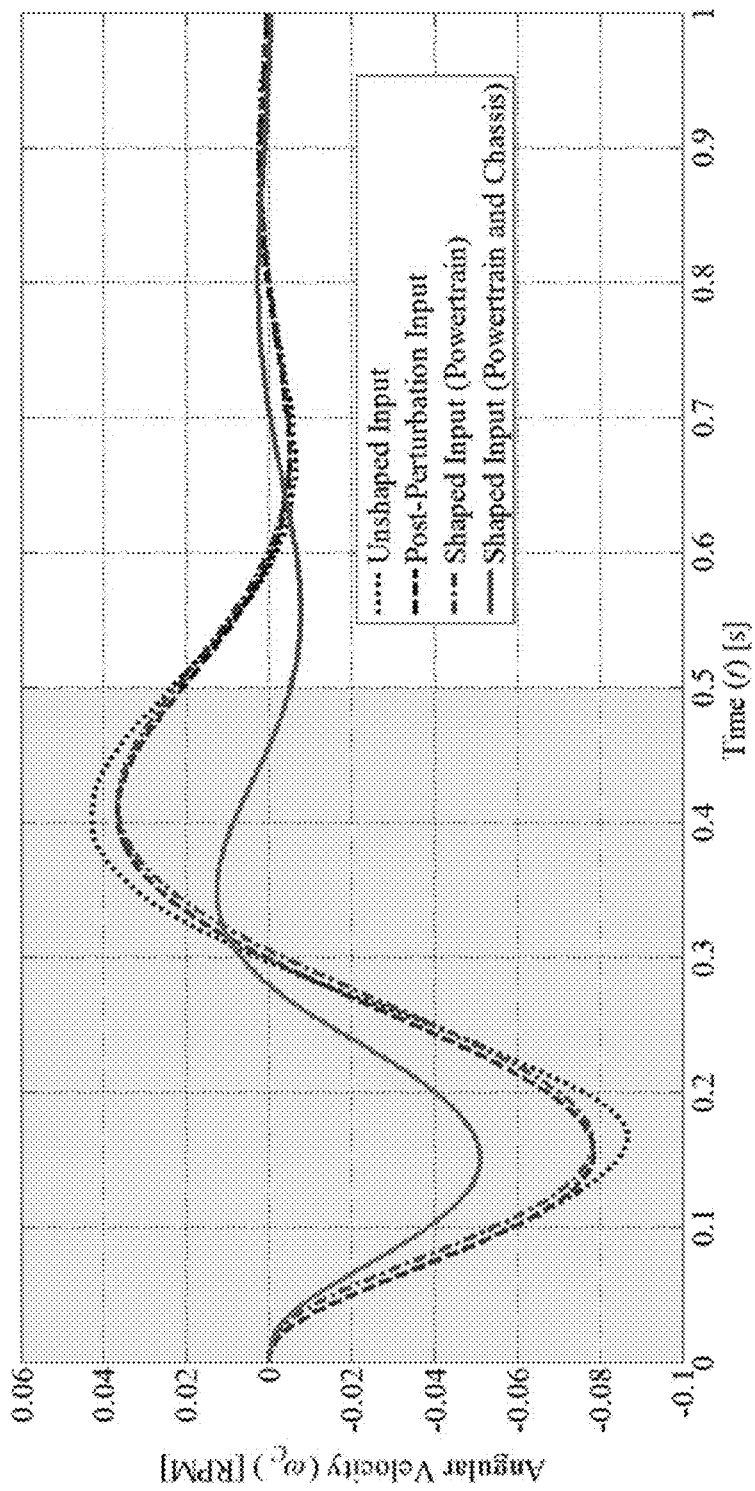
FIG. 16 illustrates angular velocity of a modeled chassis for various EM torque inputs.

FIGS. 14-16 provide the ICE, clutch, and chassis responses, respectively, when considering the EM dynamics presented in this example. Table 6 provides the damping ratios and natural frequencies of the vibration modes cancelled with command shaping in this example. In this example, including the EM dynamics alters the response due to the additional degrees of freedom, but otherwise has a small effect on the system response. This is largely due to additional dissipation from internal EM damping and the resistance element in the armature circuit. Observing FIGS. 14 through 16, the proposed method continues to mitigate the unwanted oscillations in the powertrain. The residual vibration in the chassis response decreases by 41% at its largest peak. Remaining oscillations of the chassis arise due to the torque applied to the EM housing arising from internal damping.

The higher-order vibration modes ignored in the lumped-parameter models may lead to drivability issues, although it may be more effective to configure the primary oscillatory response in the first several modes. If higher-order modes cause further drivability issues, the command shaping portion of TSCS could be updated to eliminate the vibrations associated with such modes.

TABLE 6

Natural frequencies and damping ratios for the powertrain
and chassis subsystems with the coupled DC EM model

| Parameter | Value |
|---|---|
| Powertrain subsystem natural frequency ($\omega_{np}$), rad/s | 2.32E+02 |
| Powertrain subsystem damping ratio ($\zeta_p$), Unitless | 2.71E-02 |
| Chassis subsystem natural frequency ($\omega_{nc}$), rad/s | 1.42E+01 |
| Chassis subsystem damping ratio ($\zeta_c$), Unitless | 3.55E-01 |

As will be understood, the TSCS could be applied to a system utilizing a torque source other than an EM; for example, the torque source could be a hydraulic motor, pneumatic motor, or other actuator. One example of a system utilizing a hydraulic motor as the torque source is a variable swashplate motor that uses electro-hydraulic actuators to precisely position the angle of the swashplate, which in turn determines the motor's displacement and thus delivered torque. The TSCS approach can be implemented using the example hydraulic motor via TSCS control signals to the electro-hydraulic actuators.

Using Data from Previous Restarts for Parameter Estimation

In real-time implementation, TSCS may suffer from inaccuracies or variations in the ICE parameters or modes of the powertrain and chassis systems. Variations in the vibration modes of the systems can be accounted for by robust command shaping. However, this approach cannot be used to mitigate the effect of variations in the ICE parameters since these variations impact the indicated torque of the ICE, which acts as an excitation.

Figure 17:
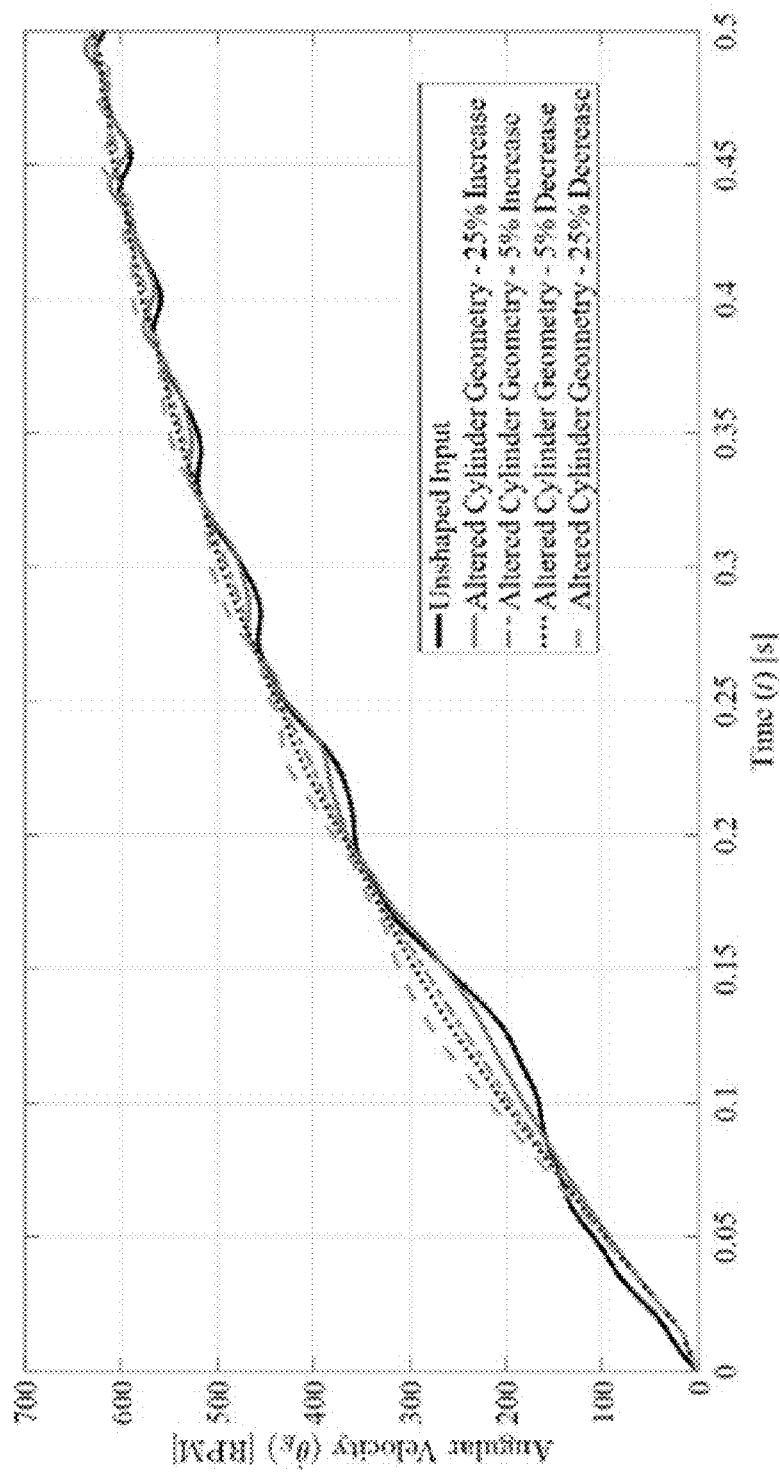
FIG. 17 illustrates angular velocity of a modeled ICE with deviations in the modeled cylinder geometry parameters.
Figure 18:
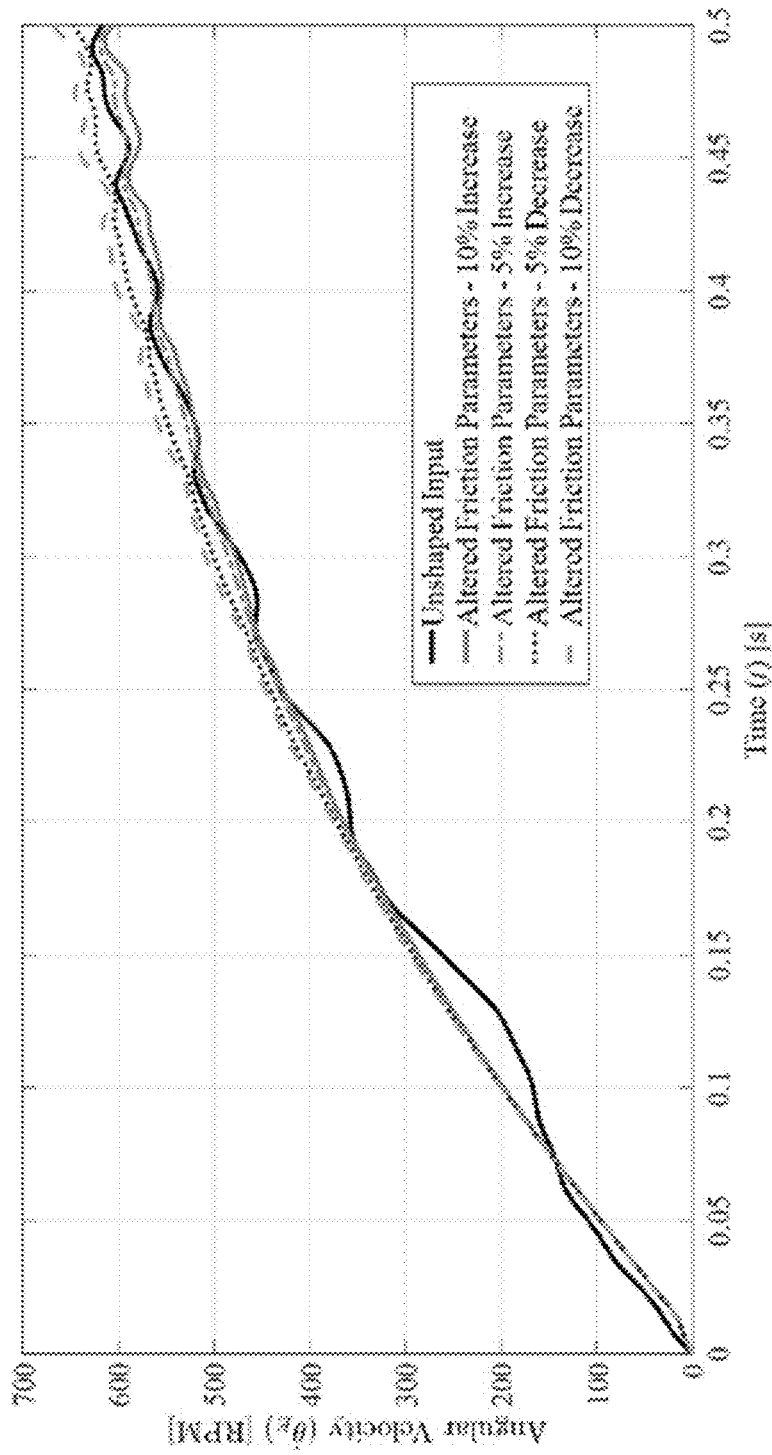
FIG. 18 illustrates angular velocity of a modeled ICE with deviations in the modeled friction parameters.

Utilizing the example implementation based on the models in FIGS. 5-7 and an ideal torque source, FIGS. 17 and 18 provide the effect of variations in cylinder geometry (FIG. 17) and friction parameters (FIG. 18) on the performance of the TSCS strategy. In this implementation, inaccuracies in cylinder geometry, such as the clearance volume and bore, have limited impact on TSCS with ±25% variations (FIG. 17). Only a small variation in cylinder volume is expected over the lifetime of a vehicle, so the effects of variations in cylinder geometry will not substantially affect the implementation of TSCS.

In this implementation, inaccuracies in ICE friction parameters can cause substantial changes in steady-state ICE response, but the transient region important in ICE restart is only affected after 0.20 seconds (FIG. 18). The TSCS strategy is robust to ±10% changes in the friction parameters. Friction in an ICE is expected to vary significantly during a vehicle's lifetime. ICE oil temperature may vary significantly. Therefore, the friction parameters can change from day-to-day or more frequently.

Related work has presented temperature dependent friction parameter models. As an alternative presented in some embodiments herein, friction parameters may be estimated by gathering data from previous restart events and utilizing an algorithm to estimate the friction parameters. Once the engine is fully warmed, most restarts will likely occur under similar conditions, meaning that data from previous restarts may be used to inform future restarts.

By way of example, and not limitation, the following embodiments describe two approaches for estimating uncertain engine friction parameters. The first approach utilizes a recursive least-squares (RLS) algorithm, and the second approach utilizes an extended Kalman filtering (EKF) algorithm. Additional parameters such as inertia, stiffness, damping, compression ratio, etc. may also be estimated based on data from previous restarts. Numerous other approaches may utilize other algorithms.

The following embodiments demonstrate that algorithms such as RLS and EKF can be implemented alongside TSCS to provide an adaptive control strategy. A single engine restart period may not provide enough data for the parameter estimation algorithms, but a single data set could be extended by mirroring it about a vertical axis at the final time and combining the mirrored and original component of the signal. Alternatively, before attempting a restart the EM could spin the crankshaft of the ICE with a known input when the vehicle is temporarily stationary.

Example Implementation using Recursive Least Squares

The objective of RLS is to estimate a constant parameter, $\theta \in \mathbb{R}^m$, which minimizes:

$$L=\int_0^t e^2(\tau)d\tau, \ e(t)=W^T(t)\theta(t)-y(t) \quad \text{(Equation 28)}$$

where e is the error in the estimated state compared to the measured output y that is calculated with the system parameter estimates and input data W.

The $\theta$ that solves Equation 28 and minimizes the error due to the parameter estimates is:

$$\theta(t)=[\int_0^t W(\tau)W^T(\tau)d\tau]^{-1}[\int_0^t W(\tau)y(\tau)d\tau]. \quad \text{(Equation 29)}$$

The RLS algorithm applies the above approach recursively. An estimator gain matrix, P, may be introduced for the solution and may be expressed as:

$$P(t)=[\int_0^t W(\tau)W^T(\tau)d\tau]^{-1} \quad \text{(Equation 30)}$$

which implies that the parameter estimates for time t can be expressed as:

$$\theta(t)=P(t)\int_0^t W(\tau)y(\tau)d\tau. \quad \text{(Equation 31)}$$

Equations 29 and 30 can be used to define the differential equations used to update the parameter estimates and estimator gain matrix, P:

$$\dot{\theta}(t)=-P(t)W(t)e(t) \quad \text{(Equation 32)}$$

$$\dot{P}(t)=-P(t)W(t)W^T P(t), \ P(0)>0 \quad \text{(Equation 33)}$$

The above expressions can be used to implement the RLS algorithm for powertrain system used in the validation of TSCS. In an example implementation, RLS is applied to update uncertain friction parameters in the ICE model represented in FIG. 1 and associated equations given above. Data gathered during a restart event may include ICE torque, ICE angular position, and ICE velocity. In the example implementation, the fundamental ICE geometry is known. Reformatting modeling equations for the ICE and powertrain system (Equations 5 and 7) for the RLS algorithm may be written for example as:

$$T_{Friction}(\theta_E) = T_{Indicated}(\theta_E) + T_{Inertial}(\theta_E) - T_E(\theta_E) \quad \text{(Equation 34)}$$

$$= \begin{bmatrix} 1 & p(\theta_E) & \dot{\theta}_E & \dot{\theta}_E^2 \end{bmatrix} \begin{bmatrix} T_{Friction_0} \\ k_p \\ k_{\omega_1} \\ k_{\omega_2} \end{bmatrix}$$

where the 1×4 row vector containing the in-cylinder pressure and angular velocity of the ICE acts as W, $T_{Friction}$ serves as the measured output, and the column vector of friction parameters act as set of parameters to be estimated with RLS. By way of example, $T_{Friction}$ is calculated by using the measured ICE torque output and subtracting out $T_{Indicated}$ and $T_{Inertial}$ evaluated with the known ICE geometry and measured ICE angular position (see Equations 6, 7, 19 and 20).

To determine the efficacy of the RLS algorithm in estimating friction parameters for the four-cylinder ICE, a sample data set was generated for an ICE restart through direct numerical integration of Equations 21 and 22. The parameters used in the generation of the sample data set for estimating the friction parameters are provided in Tables 1 through 3. For the purposes of calculation and not limitation, a 5 second sample of the response of the ICE to an unshaped command is used for the estimation approaches.

Simulation results of the example implementation shows that RLS may be effective in obtaining accurate estimations of the parameters of the friction model without using a temperature dependent model, but may require measurement of ICE torque as well as accurate ICE geometry. RLS offers a simple method to estimate the friction parameters for the friction torque since the parameters can be written in a linear fashion with the expression shown in Equation 34.

Simulation results of the example implementation demonstrates that without detailed information about the friction parameters, the RLS algorithm may be able to converge on accurate estimations of the friction parameters. Assuming an initial estimate where all of the friction parameters are zero, in the example implementation, the RLS algorithm converges to a solution that estimates $k_p$, $k_{\omega_1}$, and $k_{\omega_2}$ with a percent error of less than 2% in a time period of 0.4 seconds. In this example, the estimation of the $T_{Friction_0}$ has a higher percent error of 11.5% since it is a constant parameter in the friction torque expression in Equation 34, reducing the effectiveness of RLS in its estimation. In this example, $T_{Friction_0}$ takes significantly longer to converge to an estimation, approximately 2.5 seconds, compared to the 0.4 seconds for $k_p$, $k_{\omega_1}$, and $k_{\omega_2}$.

The accuracy of the estimated friction parameters in this example implementation can be further validated by comparing the estimated friction torque of the ICE to the actual friction torque calculated using the correct parameter definitions. Even with the 11.5% percent error in the estimated $T_{Friction_0}$, the complete estimated friction torque expression accurately represents the actual friction torque with an average percent error of 0.02% and maximum value of 5.95%.

The RLS algorithm represents a feasible approach in mitigating the detrimental effect that misidentification of the friction parameters may have on the use of TSCS. However, the example implementation presented requires measurement of the output torque of the ICE, which may be unavailable or difficult to obtain. In addition, the example implementation includes the assumption that one has an accurate representation of the ICE geometry, which may also not be the case.

Example Implementation Using Extended Kalman Filtering

In some embodiments, EKF may be used to provide an estimate of the ICE parameters. In an example implementation presented below, EKF is used to estimate ICE friction torque. EKF may have advantages in estimating ICE friction torque as an explicit measurement of the torque from the ICE may not be required, and the torque need not be assumed to be constant, in which case it can be treated as an estimated parameter. The EKF algorithm can be written for parameter estimation in a nonlinear system, such as the example powertrain systems presented and described herein may An augmented system for EKF parameter estimation may be defined as:

$$\dot{x}_A = f_A(x(t), u(t)) + F_A W_A(t) = \begin{bmatrix} f(x(t), u(t), \Theta) \\ 0 \end{bmatrix} + \begin{bmatrix} F & 0 \\ 0 & 0 \end{bmatrix} \begin{bmatrix} w(t) \\ 0 \end{bmatrix} \quad \text{(Equation 35)}$$

$$y(t) = g_A(x_A(t), u(t)) \quad \text{(Equation 36)}$$

$$z(k) = y(k) + Gv(k) \quad \text{(Equation 37)}$$

where $x_A$ denotes the augmented state vector, x the unaugmented state vector, u the input vector, $f_A$ the augmented function containing the dynamics of the system and parameters being analyzed, $f$ the original expression for the dynamics of the analyzed system, $F_A$ the additive process noise matrix for the augmented system, F the additive process noise matrix for the original system, w(t) the independent, zero-mean additive white Gaussian noise (AWGN) in the process, $W_A(t)$ the augmented process noise vector, $g_A$ the expression representing the observed output variables, and $\Theta$ a vector of parameters to be estimated with EKF.

The zeros in Equation 35 appear because it is assumed the parameters being estimated are not time-varying:

$$\dot{\Theta} = 0. \quad \text{(Equation 38)}$$

This assumption is for calculation purposes in this example, and is non-limiting.

Equation 37 provides the measurement vector, z, sampled with a sampling time of $T_S$ at N discrete time steps where G is the additive measurement noise matrix and v(k) is the independent, zero-mean AWGN in the measurements.

The augmented system is a representation of the original dynamic system with the parameters to be estimated added to the state vector of the system. In this example, the vector of estimated parameters employed is:

$$\Theta = \begin{bmatrix} \theta_1 \\ \theta_2 \\ \theta_3 \\ \theta_4 \end{bmatrix} = \begin{bmatrix} T_{Friction_0} \\ k_p \\ k_{\omega_1} \\ k_{\omega_2} \end{bmatrix} \quad \text{(Equation 39)}$$

Where Equation 38 implies that the estimated parameters are not time-varying during a single restart period of data. Therefore, the complete state vector for the analysis of the pre-transmission powertrain configuration with EKF is:

$$x_A(t) = \begin{bmatrix} x_1 \\ x_3 \\ x_3 \\ x_4 \\ \theta_1 \\ \theta_2 \\ \theta_3 \\ \theta_4 \end{bmatrix} = \begin{bmatrix} \theta_E \\ \theta_{CL} \\ \dot{\theta}_E \\ \dot{\theta}_{CL} \\ T_{Friction_0} \\ k_p \\ k_{\omega_1} \\ k_{\omega_2} \end{bmatrix} \quad \text{(Equation 40)}$$

where the degrees of freedom for the ICE and EM are combined since their coupling is assumed to be rigid for this example. With the augmented system defined in Equations 35 through 37 and the corresponding state vector provided in Equation 40, the EKF algorithm can be used for parameter estimation. EKF consists of prediction and update steps. A tilde accent denotes a predicted value in the extrapolation stage and a hat accent denotes a corrected value in the update step.

The extrapolation stage may be completed with the following calculations:

$$\tilde{x}_A(k)=\hat{x}_A(k-1)+\int_{t(k-1)}^{t(k)} f_A(\hat{x}_A(t), \overline{u}(k))dt \quad \text{(Equation 41)}$$

$$\tilde{P}_A(k)=\Phi_A(k)\hat{P}_A(k-1)\Phi_A^T(k)+T_sF_AF_A^T \quad \text{(Equation 42)}$$

where $\Phi_A(k)$ denotes a discrete time state-transition matrix for the system at the discrete time step k, $P_A$ the error covariance matrix, and a the input value interpolated between t(k−1) and t(k). The predicted state of the system is calculated with Equation 31 by using the corrected state estimation from the previous time step and extending it to the next time step integrating the known dynamics of the augmented system from the previous time step to the current.

Equation 42 is a linear approximation of the error covariance matrix for small $T_S$, which neglects higher-order terms and makes the EKF a non-optimal approximation of Kalman Filtering (KF) for a non-linear system. The discrete time state-transition matrix of the augmented system may be defined as:

$$\Phi_A(k)=e^{A_A(k)T_S} \quad \text{(Equation 43)}$$

where $A_A(k)$ is the linearized state matrix for the augmented system:

$$A_A(k) = \frac{\partial f_A}{\partial x_a}\bigg|_{x_A=\hat{x}_A(k-1)} = \begin{bmatrix} \frac{\partial f}{\partial x} & \frac{\partial f}{\partial \Theta} \\ 0 & 0 \end{bmatrix}\bigg|_{x_A=\hat{x}_A(k-1)} \quad \text{(Equation 44)}$$

The complete expression for the linearized state matrix of the augmented system consisting of the powertrain model may be expressed by the equation provided in FIG. 19.

The update stage may consist of the following calculations:

$$\tilde{y}(k)=g_A(\tilde{x}_A(k), u(k)) \quad \text{(Equation 45)}$$

$$K_A(k)=\tilde{P}_A(k)C_A^T(k)[C_A(k)\tilde{P}_A(k)C_A^T(k)+GG^T]^{-1} \quad \text{(Equation 46)}$$

$$\hat{x}_A(k)=\tilde{x}_A(k)+K_A(k)[z(k)-\tilde{y}(k)] \quad \text{(Equation 47)}$$

$$\hat{P}_A(k)=[I-K_A(k)C_A(k)]\tilde{P}_A(k)[I-K_A(k)C_A(k)]^T+K_A(k)GG^TK_A^T(k) \quad \text{(Equation 48)}$$

where the output of the powertrain model is defined in this example as the angular position and velocity of the ICE and driven plate assembly of the clutch. In this example, Equation 45 is used to calculate the predicted output variables that are compared to measurements. The Kalman gain in Equation 46 is the linear filter gain that minimizes the mean square error between the predicted output and measured data using Equation 47 to arrive at the corrected state values. Equation 48 updates the value of the error covariance matrix for the extrapolation stage in the next time step based on the current Kalman gain.

The $C_A$ in Equations 46 and 48 is the linearized output matrix:

$$C_A(k) = \frac{\partial g_A}{\partial x_a}\bigg|_{x_A=\hat{x}_A(k)} = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix} \quad \text{(Equation 49)}$$

where $C_A$ has the simple representation given because the output vector is defined as the angular position and velocity of the ICE and driven plate assembly of the clutch. To use this approach, several values have to be defined, such as the initial value for $P_A$ as well as the values for F and G. The initial definition of $P_A$ is a representation of the confidence in initial state estimates. $FF^T$ and $GG^T$ are the process and measurement covariance matrices, respectively. The measurement covariance matrix is calibrated based on the sensors and measurements taken, but a trial and error or adaptive filtering technique may be required to define the process covariance matrix.

Based on the example EKF implementation presented above, EKF may be used to estimate the friction parameters based only on measurements of the angular position and velocity of the ICE. The EKF process applied in conjunction with the TSCS strategy can handle large misidentification of the friction parameters.

Using the converged parameters from the EKF process, the estimated friction torque is compared to the actual friction torque for the four-cylinder ICE model with a +10% misidentification of all of the friction parameters and separately, a +37.5% inaccuracy in all of the friction parameters. In both cases, the converged EKF algorithm results in estimated friction parameters that closely resemble the actual friction torque of the four-cylinder ICE. The EKF process applied can also handle zero and negative initial estimates of the friction parameters.

Applying the EKF algorithm requires one to also provide an initial estimate of the error covariance matrix $P_A$. This estimate along with $T_S$ can severely impact the convergence of the algorithm, so care has to be taken in the choice of these values and sensors when applying the EKF approach to a new system.

Even with a large inaccuracy in friction parameters, up to +37.5%, the EKF algorithm provides an implementable approximation to the friction torque of the ICE that maintains an average percent error of 1.69%. The average percent error for the friction torque reduces to 0.03% for an initial parameter inaccuracy of +10%. When observing the convergence of each friction parameter separately, it is noted that the parameters do not converge to the values defined for the four-cylinder ICE, but instead converge to an alternative solution that minimizes the error in the estimation of the friction torque for the ICE.

The convergence of the friction parameters of the ICE to an alternative solution implies non-uniqueness in the specification of the friction torque parameters. Convergence of the friction parameters of the ICE to alternate values does not adversely affect the efficacy of using the EKF algorithm to correct inaccuracies in the definition of the ICE tool.

Embodiment of System

Figure 20:
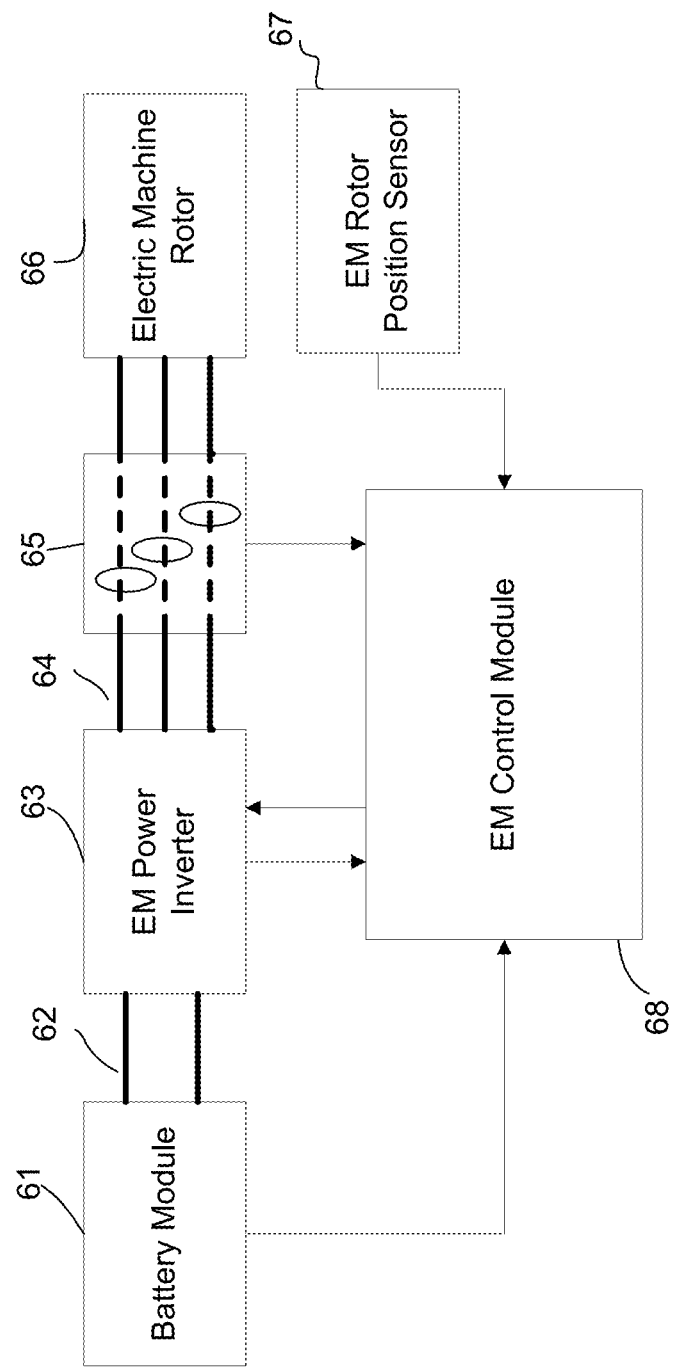
FIG. 20 depicts a block diagram of a portion of an example electrical system for driving an EM.

FIG. 20 illustrates a block diagram of an example embodiment of a system that may be configured to utilize TSCS. The components presented in FIG. 20 are typical of what may be present in a HEV having an EM as a torque source. As will be appreciated, embodiments of systems configured to utilized TSCS are not limited to HEVs, nor is the torque source limited to an EM. The example system shown in FIG. 20 includes a battery module 61, DC bus bars 62 connecting the battery module 62 to an EM power inverter 63, AC bus bars 64 connected to the electric machine rotor 66 through a current sensor 65, an EM rotor position sensor 67, and an EM control module 68.

In the example embodiment, the EM control module 68 provides a command signal to the EM power inverter 63; the EM power inverter 63 provides a voltage output based on the provided command signal, and the electric machine rotor 66 provides a torque based on the voltage output and the command signal. Applying TSCS, the command signal is configured to cause the generation of the EM torque such that the EM torque counteracts vibrations caused by non-linear torque dynamics of rotation of the crankshaft of the ICE during start or restart and counteract vibrations of mechanical components or groups of mechanical components in mechanical communication with the ICE. In some embodiments, the command signal may include a non-linear component to counteract the non-linear torque dynamics of the ICE and an input shaped component to counteract vibrations of mechanical components or groups of components due to linear ramp-up of the ICE.

In the example embodiment shown in FIG. 20, the EM control module 68 is configured to receive data from the battery module 61, the EM power inverter 63, the current sensor 65, and the EM rotor position sensor 67. The EM rotor position sensor 67 is mechanically coupled to the electric machine rotor 66 and translates the rotational angle of the electric machine rotor 66 into an electrical signal. In embodiments where the EM rotor is coupled to the ICE crankshaft, the EM rotor position sensor 67 also provides the rotational angle of the ICE. The rotational angle of the ICE is used in some embodiments to determine the non-linear component of the command signal. The EM control module may utilize current sensor 65 data, voltage data from the EM power inverter 64, and EM rotor position sensor data to calculate the EM torque and adjust the command signal accordingly.

The EM control module 68 may have access to additional data such as the battery module temperature sensor, battery current sensor, vehicle diagnostic data, whether the brake pedal is pressed, or other on-board sensors such as accelerometers, temperature sensors, displacement sensors, pressure sensors, or air flow sensors. The EM control module may utilize sensor data to generate a command signal. Such data may be utilized, for example, to perform parameter estimation as described above.

CONCLUSIONS

The specific configurations, choice of materials and the size and shape of various elements can be varied according to particular design specifications or constraints requiring a system or method constructed according to the principles of the present invention. Such changes are intended to be embraced within the scope of the present invention. The presently disclosed embodiments, therefore, are considered in all respects to be illustrative and not restrictive. The patentable scope of certain embodiments of the present invention is indicated by the appended claims, rather than the foregoing description, and all changes that come within the meaning and range of equivalents thereof are intended to be embraced therein.

What is claimed:

1. A method for reducing vibration during start or restart of an internal combustion engine (ICE), the method comprising:
   providing a command signal to a torque source, wherein the command signal is comprised of a sum of a non-linear component and an input shaped component,
   wherein the non-linear component of the command signal is based at least in part on an approximation of non-linear torque dynamics of rotation of a crankshaft of the ICE during start or restart, and
   wherein the input shaped component of the command signal is based at least in part on a first natural frequency and a first damping ratio of a first vibration mode, wherein the first vibration mode is a property of a first mechanical component or first group of mechanical components in mechanical communication with the ICE; and
   generating, by the torque source, a torque output in response to the command signal, wherein the command signal is configured to cause the generation of the torque output such that the torque output counteracts vibration caused by the non-linear torque dynamics of rotation of the crankshaft of the ICE during start or restart and counteracts vibration of the first vibration mode of the first mechanical component or first group of mechanical components.

2. The method of claim 1, wherein the non-linear component of the command signal is further based at least in part on a crank angle of the ICE as a function of time, wherein the crank angle is the angle of rotation of a crankshaft associated with motion within a cylinder of the ICE.

3. The method of claim 2, wherein the approximation of the non-linear torque dynamics of the ICE comprise an asymptotic approximation of the crank angle, wherein the asymptotic approximation of the crank angle includes a zeroth-order term and a first order term and the approximation of the non-linear torque dynamics of the ICE is determined by equating the acceleration of the first-order term and its derivatives to zero.

4. The method of claim 1, wherein the input shaped component of the command signal is configured to reduce the vibration of the first mechanical component or first group of mechanical components, the vibration of the first mechanical component or first group of mechanical components being caused by a linear ramp-up of torque generated by rotation of the crankshaft of the ICE during start or restart of the ICE.

5. The method of claim 1, wherein the first mechanical component or first group of mechanical components includes a component or group of components from a powertrain or chassis of a vehicle.

6. The method of claim 1, wherein the input shaped component of the command signal is based at least in part on at least one of a Zero Vibration (ZV) input shaper, a Zero Vibration and Derivative (ZVD) input shaper, and an Extra-Intensive (EI) input shaper.

7. The method of claim 1,
   wherein the input shaped component of the command signal is further based on a second natural frequency and a second damping ratio of a second vibration mode, wherein the second vibration mode is a property of a second mechanical component or second group of mechanical components in mechanical communication with the ICE, and
   wherein a first input shaper is defined for the first vibration mode, a second input shaper is defined for the second vibration mode, and the input shaped component of the command signal includes a convolution of the first and second input shapers.

8. The method of claim 1, wherein the command signal is further based at least in part on a physical model of piston kinematics of the ICE.

9. The method of claim 8, wherein the physical model of piston kinematics of the ICE includes a plurality of physical parameters and one or more of the plurality of physical parameters are predetermined based on an operating condition of the ICE.

10. The method of claim 8, wherein the physical model of piston kinematics of the ICE includes a plurality of physical parameters and one or more of the plurality of physical parameters is estimated based on data from previous starts or restarts of the ICE.

11. The method of claim 10, wherein estimating the physical parameters is performed at least in part using a recursive least-square (RLS) or extended Kalman filtering (EKF) based on data from previous restarts of the ICE.

12. The method of claim 10, wherein the plurality of physical parameters comprise at least one of inertia, stiffness, damping, friction coefficient, and compression ratio.

13. A system for reducing vibration during start or restart of an internal combustion engine (ICE), the system including:
an internal combustion engine (ICE) having a crankshaft;
an electric machine (EM) having a rotor that is mechanically coupled to the crankshaft of the ICE; and
an electronic controller configured to provide a command signal to the EM, the command signal comprised of a sum of a non-linear component and an input shaped component,
wherein the non-linear component of the command signal is based at least in part on an approximation of non-linear torque dynamics of rotation of the crankshaft of the ICE during start or restart, and
wherein the input shaped component of the command signal is based at least in part on an input shaper characterized by a first natural frequency and a first damping ratio of a first vibration mode, wherein the first vibration mode is a property of a first mechanical component or first group of mechanical components in mechanical communication with the ICE.

14. The system of claim 13, further comprising a memory device in communication with the electronic controller, the memory device configured to store data to provide to the electronic controller, wherein the providing of the stored command signal by the electronic controller is based at least in part on data provided from the memory device.

15. The system of claim 13, further comprising a plurality of sensors, wherein the electronic controller is further configured to receive data from at least one of the plurality of sensors and the command signal is further based at least in part on the received data.

16. The system of claim 15, wherein the at least one of the plurality of sensors includes a shaft encoder configured to convert a crank angle of the ICE to an electrical signal, wherein the crank angle is the angle of rotation of a crankshaft associated with motion within a cylinder of the ICE, wherein the electrical signal is convertible into data that is receivable by the electronic controller.

17. The system of claim 15, wherein the at least one of the plurality of sensors includes at least one of an accelerometer, a temperature sensor, a displacement sensor, a phase motor current sensor, a battery current sensor, an EM rotor position sensor, a pressure sensor, and an air flow sensor.

18. A method for reducing vibration during start or restart of an ICE, the method comprising:
providing a command signal to a torque source, wherein the command signal is comprised of a sum of a non-linear component and an input shaped component,
wherein the non-linear component of the command signal is configured to reduce vibration of the ICE, the vibration of the ICE being caused by non-linear torque dynamics of the rotation of a crankshaft of the ICE during start or restart of the ICE,
wherein the input shaped component of the command signal is configured to reduce vibration of a first mechanical component or first group of mechanical components, the vibration of the first mechanical component or first group of mechanical components being caused by a linear ramp-up of torque generated by rotation of the crankshaft of the ICE during start or restart of the ICE, and
wherein the command signal is configured to cause the generation of a torque output from the torque source such that the torque output reduces the vibration of the ICE and the vibration of the first mechanical component or first group of mechanical components during start or restart of the ICE.

19. The method of claim 18, wherein a perturbation technique applied to a physical model of a piston crank-slider system of the ICE is used to approximate the non-linear torque dynamics of the rotation of the crankshaft of the ICE during start or restart of the ICE.

20. The method of claim 18, wherein a lumped parameter model including models of the first mechanical component or first group of mechanical components, the ICE, and a coupling between the first mechanical component or first group of mechanical components and the ICE provides a means to determine a natural frequency and a damping ratio, wherein the input shaped component is based at least in part on an input shaper characterized by the natural frequency and the damping ratio.

* * * * *